United States Patent
Hotta et al.

(10) Patent No.: US 8,770,620 B2
(45) Date of Patent: Jul. 8, 2014

(54) AIRBAG APPARATUS

(71) Applicant: Toyoda Gosei Co., Ltd., Kiyosu (JP)

(72) Inventors: Masashi Hotta, Kiyosu (JP); Yuji Sato, Kiyosu (JP); Kensaku Honda, Kiyosu (JP); Hitoshi Kawabe, Kiyosu (JP); Hiroshi Kato, Kiyosu (JP)

(73) Assignee: Toyoda Gosei Co., Ltd., Aichi-pref. (JP)

( * ) Notice: Subject to any disclaimer, the term of this patent is extended or adjusted under 35 U.S.C. 154(b) by 0 days.

(21) Appl. No.: 14/010,626

(22) Filed: Aug. 27, 2013

(65) Prior Publication Data

US 2014/0084571 A1    Mar. 27, 2014

(30) Foreign Application Priority Data

Sep. 27, 2012    (JP) ................... 2012-214432

(51) Int. Cl.
*B60R 21/26* (2011.01)
(52) U.S. Cl.
USPC ...................................... 280/730.2
(58) Field of Classification Search
USPC .............................. 280/730.2, 836
See application file for complete search history.

(56) References Cited

U.S. PATENT DOCUMENTS

| | | | |
|---|---|---|---|
| 6,106,004 A * | 8/2000 | Heinz et al. .................. 280/729 |
| 6,231,069 B1 * | 5/2001 | Yokoyama ................. 280/730.2 |
| 6,976,702 B2 * | 12/2005 | Yokota et al. .............. 280/730.2 |
| 7,793,973 B2 * | 9/2010 | Sato et al. .................. 280/730.2 |
| 8,328,227 B2 * | 12/2012 | Shimono ....................... 280/729 |
| 8,562,015 B2 * | 10/2013 | Yamamoto ..................... 280/729 |
| 2005/0057025 A1 * | 3/2005 | Hofmann ................... 280/730.2 |
| 2012/0025499 A1 | 2/2012 | Shibayama et al. |
| 2013/0200598 A1 * | 8/2013 | Honda et al. ............... 280/730.2 |
| 2013/0234421 A1 * | 9/2013 | Honda et al. .................. 280/729 |

FOREIGN PATENT DOCUMENTS

JP    2012-030614 A    2/2012

* cited by examiner

*Primary Examiner* — Faye M. Fleming

(74) *Attorney, Agent, or Firm* — Posz Law Group, PLC

(57) ABSTRACT

Inside of an airbag is partitioned by a partitioning member into an upstream inflation portion, which is inflated by a supply of gas, and a downstream inflation portion, which is inflated by inflow of the gas from the upstream inflation portion. The partitioning member includes a wide portion where an external force to be applied accompanying an occupant restraint by the airbag becomes largest. In the partitioning member, slits are formed at portions other than the wide portion. The slits cause the gas to flow into the downstream inflation portion from the upstream inflation portion upon the inflation of the airbag. The slits are opened by the force to increase the flow rate of the gas into the downstream inflation portion from the upstream inflation portion during the occupant restraint by the airbag compared to the gas flow rate before the occupant restraint by the airbag.

7 Claims, 18 Drawing Sheets

Befor Restraint of Occupant
(Lateral Tension Great)

During Restraint of Occupant
(Lateral Tension Small)

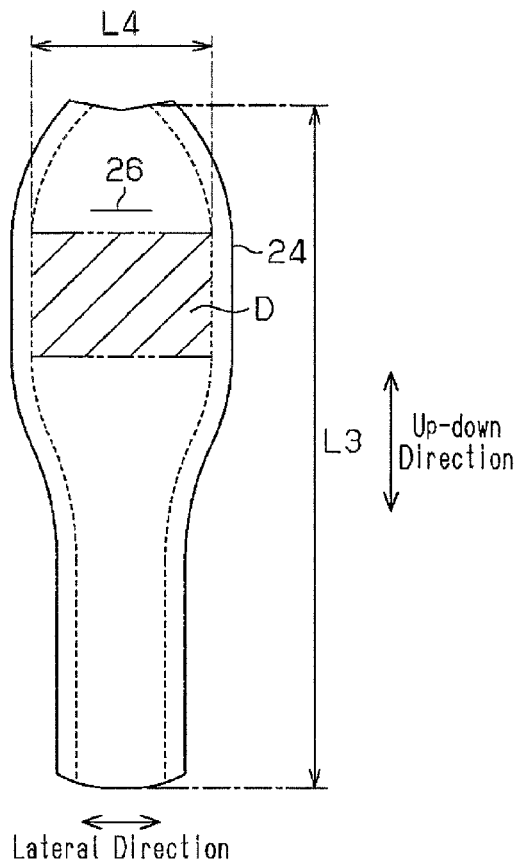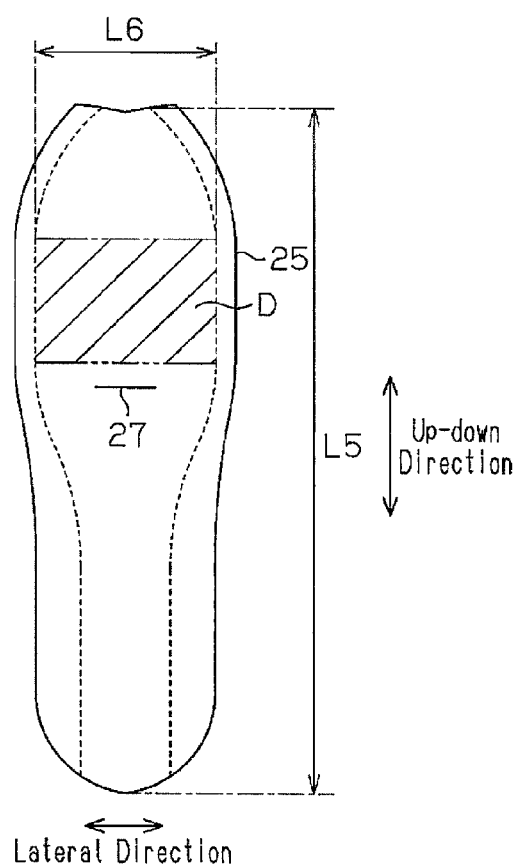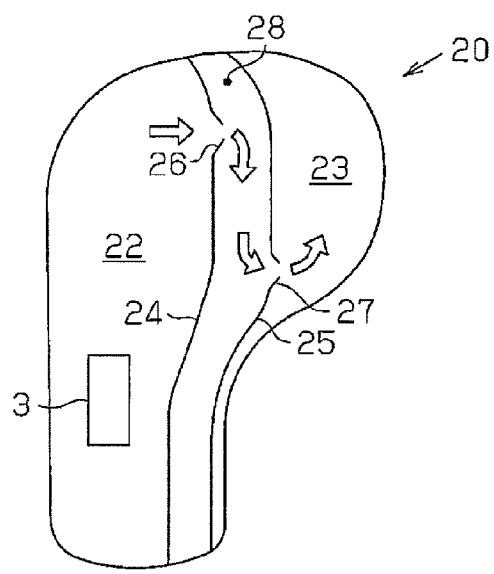

AIRBAG APPARATUS

BACKGROUND OF THE INVENTION

The invention relates to an airbag apparatus that protects an occupant by inflating and deploying an airbag at a position close to the occupant seated in a vehicle seat.

An airbag apparatus is provided with an airbag and an inflator that generates inflation gas for inflating the airbag. In recent years, a proposal to partition inside of the airbag with a plurality of inflation portions, and respectively adjust internal pressure in those inflation portions has been made.

For example, in an airbag apparatus described in Japanese Laid-Open Patent Publication No. 2012-30614, inside of an airbag is partitioned into an upstream inflation portion and a downstream inflation portion by a partitioning member. Inflation gas is directly supplied to the upstream inflation portion from an inflator, and the inflation gas is supplied to the downstream inflation portion via the upstream inflation portion. Further, the partitioning member is provided with a pressure regulating valve that adjusts the flow rate of the inflation gas flowing into the downstream inflation portion from the upstream inflation portion. The pressure regulating valve has such a structure that it opens when the airbag is inflated and restrains an occupant. That is, the pressure regulating valve opens by utilizing reduction of tension on the partitioning member caused by the partitioning member being bent by an external force applied to the airbag accompanying the restraint of the occupant by the airbag. In the apparatus described in Japanese Laid-Open Patent Publication No. 2012-30614, in order to realize the pressure regulating valve to open for sure, the pressure regulating valve is arranged at a portion where the external force becomes the largest (specifically, a center portion of the partitioning member).

SUMMARY OF THE INVENTION

In an airbag apparatus of which inside of an airbag is partitioned into a plurality of inflation portions, requirements in a manner of deployment (deploying timing, deploying speed and the like) of each inflation portion differ depending on settings of the position, the size, and the like of each inflation portion.

Although the apparatus described in Japanese Laid-Open Patent Publication No. 2012-30614 can properly open the pressure regulating valve, the opening manner (opening timing, opening speed, and the like) of the pressure regulating valve cannot be set freely, and the manner of deployment of each inflation portion cannot be set freely. Due to this, depending on cases, there is a possibility that it cannot sufficiently address the requirements of the manner of deployment of each inflation portion of the airbag.

Accordingly, it is an objective of the present invention to provide an airbag apparatus that can set freely the deployment manner of a plurality of inflation portions.

To achieve the foregoing objective, and in accordance with one aspect of the present invention, an airbag apparatus having an airbag is provided. The airbag includes an upstream inflation portion, a downstream inflation portion, and a gas inlet portion. The upstream inflation portion and the downstream inflation portion are defined inside the airbag. The upstream inflation portion is located upstream of the downstream inflation portion. The upstream inflation portion is inflated by a supply of inflation gas. The downstream inflation portion is inflated by an inflow of the inflation gas from the upstream inflation portion. The gas inlet portion causes the inflation gas to flow from the upstream inflation portion to the downstream inflation portion upon the inflation of the airbag. When the airbag restrains an occupant, the gas inlet portion increases a flow rate of the inflation gas from the upstream inflation portion to the downstream inflation portion in accordance with an external force applied to the airbag accompanying the restraint of the occupant compared to a flow rate of the inflation gas before the restraint of the occupant by the airbag. The gas inlet portion is provided at a portion other than a portion where the external force becomes largest in the airbag.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 12A is a front view illustrating a planar structure of a first partitioning member;

FIG. 12B is a front view illustrating a planar structure of a second partitioning member;

FIG. 13 is a schematic diagram showing an internal structure of the airbag and a flow of inflation gas during an inflation of a downstream inflation portion;

DETAILED DESCRIPTION OF THE PREFERRED EMBODIMENTS

First Embodiment

An airbag apparatus according to a first embodiment will now be described.

Figure 1:
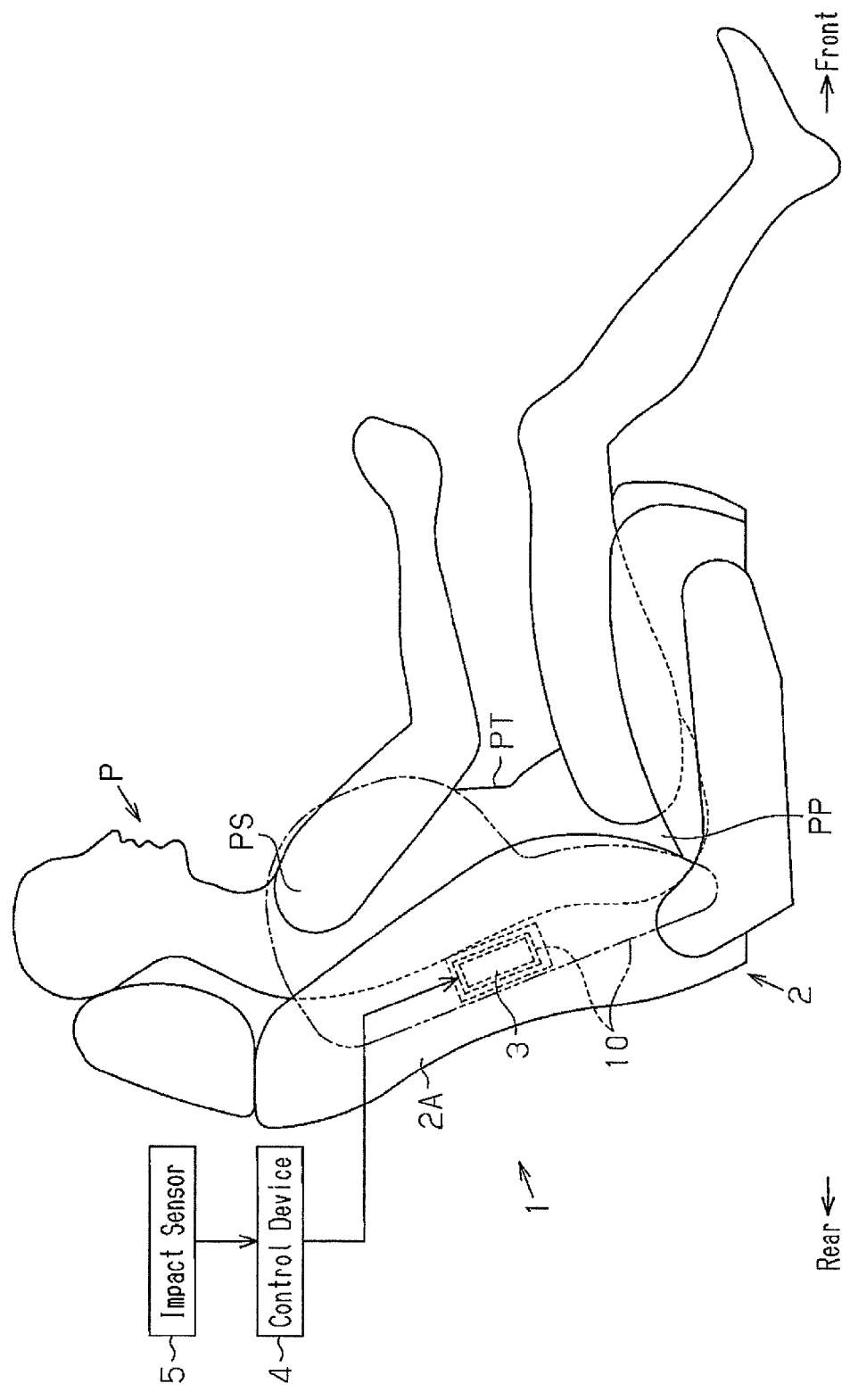
FIG. 1 is a side view illustrating a vehicle seat on which an airbag apparatus according to a first embodiment of the present invention is applied, together with an occupant and an airbag.

As shown in FIG. 1, an airbag apparatus 1 includes an airbag 10, an inflator 3 for supplying inflation gas to the airbag 10, and a control device 4 that controls gas supplied by the inflator 3 to the airbag 10. The airbag 10 is arranged in a folded state in a backrest 2A of a seat 2, where an occupant P is seated in a vehicle. An impact sensor 5 provided at a body side portion of the vehicle and configured of an acceleration sensor and the like is connected to the control device 4. The impact sensor 5 detects an impact applied to the body side portion of the vehicle, and transmits a detection signal to the control device 4. The control device 4 supplies gas to the airbag 10 by activating the inflator 3 upon receipt of a detection signal from the impact sensor 5. In FIG. 1, the airbag 10 in the folded state is illustrated in a broken line, and the airbag 10 in a deployed and inflated state is illustrated by a broken line in which a long dash alternates with a pair of short dashes.

Figure 2:
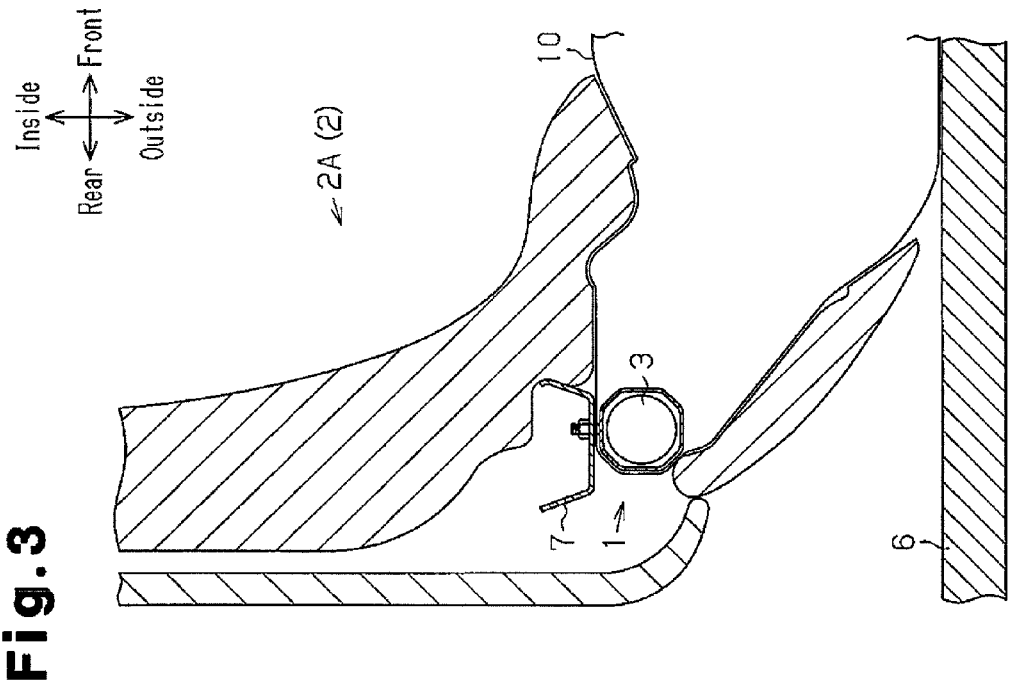
FIG. 2 is a partial cross-sectional plan view illustrating the airbag and an inflator mounted on the backrest of the seat, together with a body side portion.
Figure 3:
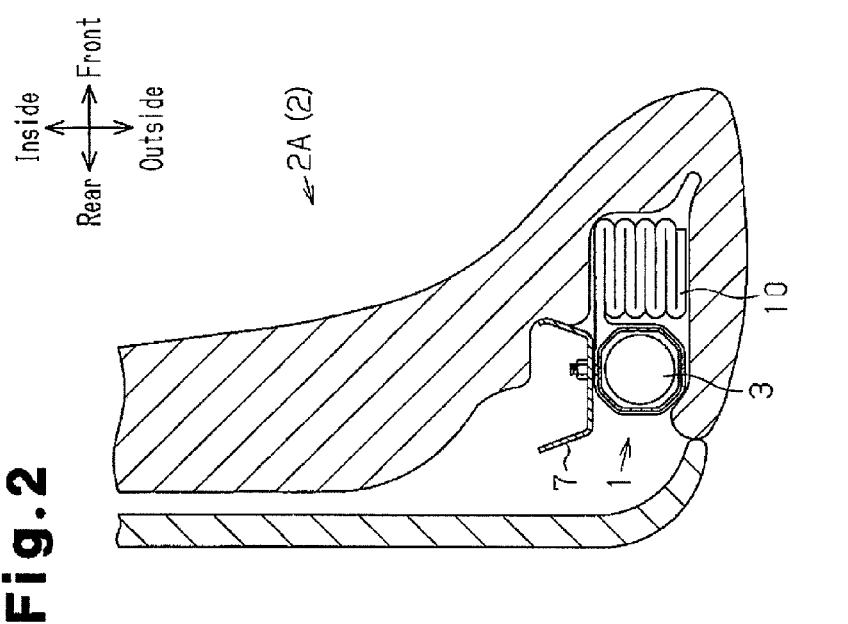
FIG. 3 is a partial cross-sectional plan view illustrating the state in which the airbag has projected out of the backrest and is inflated and deployed from the state shown in FIG. 2.

As shown in FIG. 2, the airbag 10 in a folded state and the inflator 3 for supplying the inflation gas to the airbag 10 are installed inside the backrest 2A at a portion in the vicinity of the body side portion 6 of the vehicle. The inflator 3 is secured to a frame 7 of the backrest 2A together with the folded airbag 10. When the inflation gas is supplied from the inflator 3 to the airbag 10, the airbag 10 starts being deployed and inflated. Accordingly, as shown in FIG. 3, the airbag 10 is projected out of the backrest 2A while leaving part of the airbag 10 in the vicinity of the inflator 3 in the backrest 2A. In this manner, the airbag 10 is inflated through supply of the inflation gas from the inflator 3.

Figure 4:
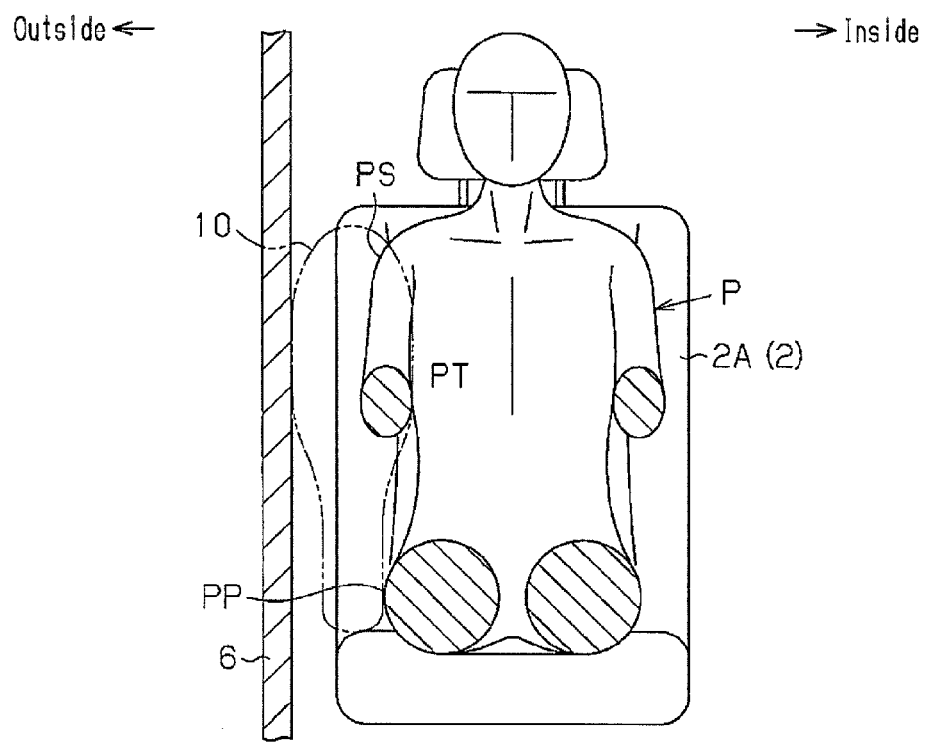
FIG. 4 is a front cross-sectional view illustrating the positional relationship between the vehicle seat and the body side portion, together with the occupant and the airbag.
Figure 5:
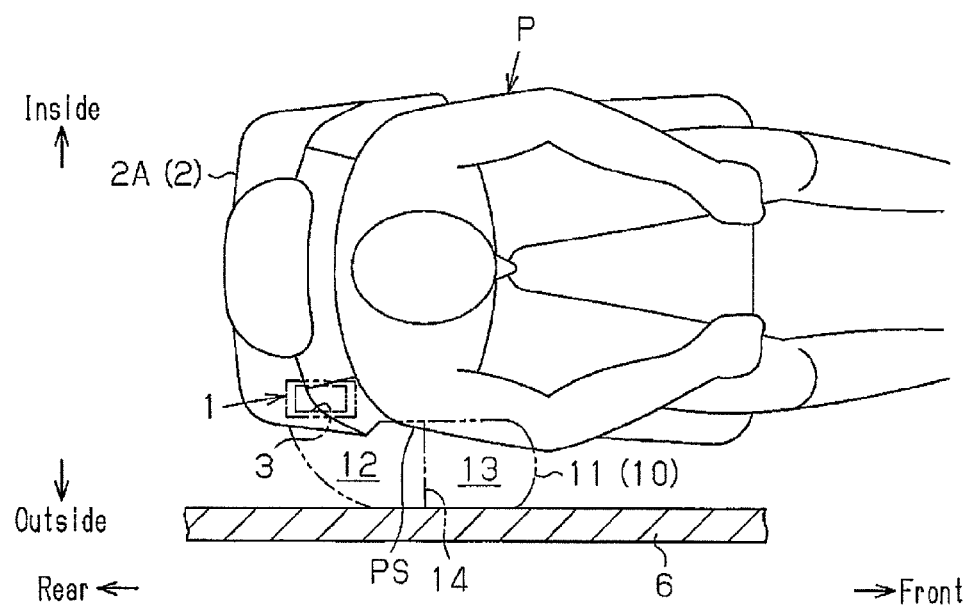
FIG. 5 is a cross-sectional plan view illustrating the positional relationship between the vehicle seat and the body side portion, together with the occupant and the airbag.

As shown in FIGS. 4 and 5, the airbag 10 is deployed and inflated on the side of the occupant P seated in the seat 2 and between the occupant P and the body side portion 6 of the vehicle. As apparent from FIGS. 4 and 5, the airbag 10 is deployed and inflated at a side of a portion including a shoulder PS, a thorax PT, and a lumbar region PP of the occupant P seated in the seat 2.

Next, the structure of the airbag 10 will be described.

Figure 6:
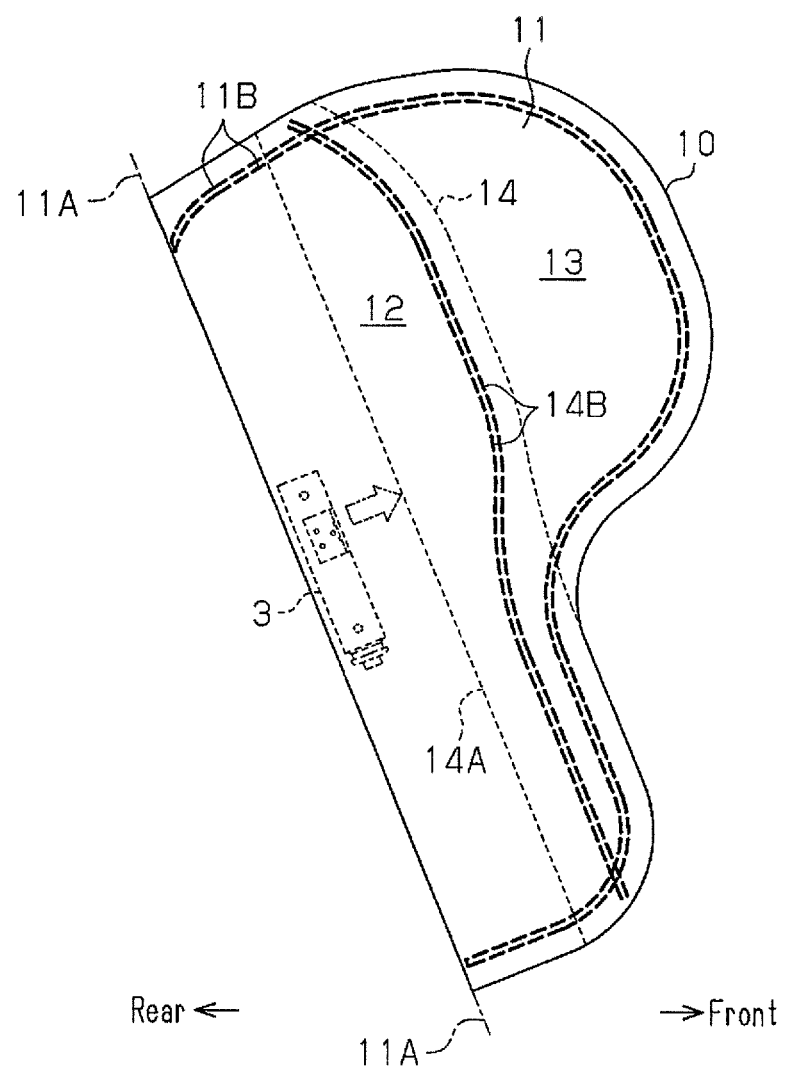
FIG. 6 is a side view illustrating the airbag in a non-inflated state.
Figure 7:
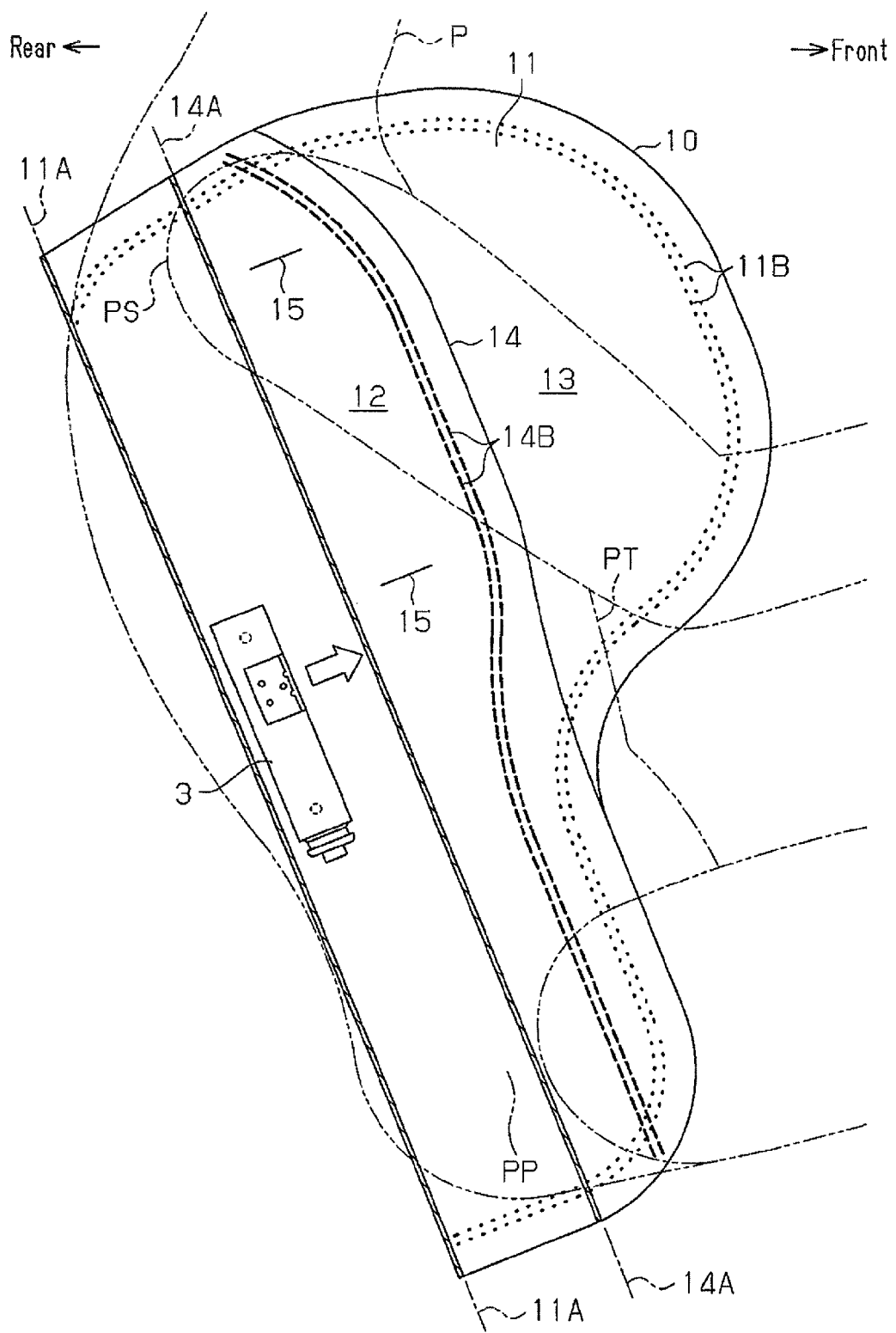
FIG. 7 is a cross-sectional view illustrating the airbag in the non-inflated state at a center in a vehicle lateral direction.

FIG. 6 illustrates a aide structure of the airbag 10 in a non-inflated state, and FIG. 7 illustrates a cross-sectional structure of the airbag 10 in the non-inflated state at a center in a vehicle lateral direction.

As shown in FIGS. 6 and 7, the airbag 10 is formed into a bag shape by folding one piece of base fabric sheet 11 along a folding line 11A in half such that the peripheral portions of the base fabric sheet 11 overlap each other in the thickness direction, and then sewing and joining the peripheral portions along a seam 11B. A woven fabric formed of material having high strength and flexibility (for example, polyester yarn or polyamide yarn) is used as the base fabric sheet 11. In FIGS. 6 and 7, the sewn portion is expressed by two types of lines. A line expressed by intermittently aligning thick lines with a certain length (one type of broken line) illustrates a state of a sewing thread on an outer surface of the fabric sheet 11 sewn by a sewing thread. A line expressed by aligning dots at a certain interval (one type of broken line) illustrates a state of a sewing thread on an inner surface (mating surface) of the fabric sheet 11.

The airbag 10 has a partitioning member 14 that partitions the inside of the airbag 10 into a portion on a rear side (upstream inflation portion 12) and a portion on a front side (downstream inflation portion 13) attached thereto. The partitioning member 14 is formed by a woven fabric that is the same material as the fabric sheet 11. The partitioning member 14 is joined to the fabric sheet 11 by its peripheral portions being sewn along a seam 14B. The partitioning member 14 has the same structure as a member generally referred to as a tether. The partitioning member 14 is attached to the inside of the airbag 10 in a state of being folded at a folding line 14A so that its peripheral portions overlap in the thickness direction when the airbag 10 is in the non-inflated state. When the inflation gas is supplied and the airbag 10 is deployed and inflated, the partitioning member 14 is tensed by being deployed in a substantially planar shape to partition the upstream inflation portion 12 and the downstream inflation portion 13. The inflator 3 is located inside the upstream inflation portion 12. Further, as illustrated in FIGS. 1 and 7, the upstream inflation portion 12 is deployed and inflated at a position on a side of and rearward of a part of the occupant P from the shoulder PS to the lumbar region PP, and the downstream inflation portion 13 is deployed and inflated at a position on a side of and forward of an upper part of the upper half of the body of the occupant P.

Figure 8:
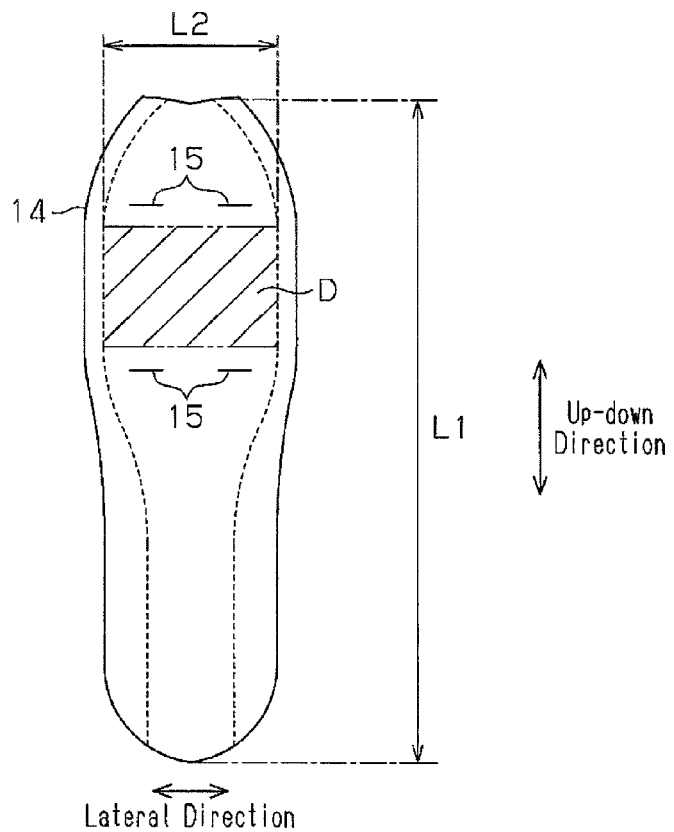
FIG. 8 is a front view illustrating a planar structure of a partitioning member.

FIG. 8 illustrates a planar structure of the partitioning member 14. Broken lines in FIG. 8 illustrate positions of the seam where the partitioning member 14 is sewn onto the fabric sheet 11. A portion illustrated by slanted lines in FIG. 8 illustrates a wide portion D, which is the widest in a vehicle lateral direction at a partitioning portion that actually partitions the upstream inflation portion 12 and the downstream inflation portion 13 in the partitioning member 14.

As illustrated in FIG. 8, the partitioning member 14 has four slits 15 (linear cuts) formed thereon. Each slit 15 is formed in a shape that linearly extends in the vehicle lateral direction upon the deployment of the partitioning member 14. Two out of the four slits 15 are formed at positions above the wide portion D in the partitioning portion that actually partitions the upstream inflation portion 12 and the downstream inflation portion 13 in the partitioning member 14, and the remaining two out of the respective slits 15 are formed at positions lower than the wide portion D. Of the respective slits 15, the two slits 15 formed above the wide portion D and the two slits 15 formed below the wide portion D are respectively formed at positions aligning in the vehicle lateral direction. In the first embodiment, these slits 15 operate as a gas inlet portion.

Operation

Operation of the partitioning member 14, on which the slits 15 are formed, will be described.

The inflator 3 is located inside the upstream inflation portion 12 of the airbag 10 (FIG. 6). Due to this, when the inflator 3 is activated and the inflation gas is generated, the upstream inflation portion 12 is firstly deployed and inflated. The partitioning member 14 is tensed by being deployed in the substantially planar shape accompanying an increase in the internal pressure of the upstream inflation portion 12.

As illustrated in FIG. 8, a length L1 in a vertical direction (up and down direction) of the partitioning portion that actually partitions the upstream inflation portion 12 and the downstream inflation portion 13 of the partitioning member 14 is longer than a length L2 thereof in a lateral direction (vehicle lateral direction) (L1>L2). Due to this, in the partitioning member 14, in the state of being tensed by being deployed in the substantially planar shape, tension acting in the lateral direction tends to be strong relative to tension acting in the vertical direction. In the partitioning member 14, the respective slits 15 extend in the lateral direction. Due to this, the tension in the vertical direction acts to open the respective slits 15, whereas the tension in the lateral direction acts to close the respective slits 15.

Figure 9A:
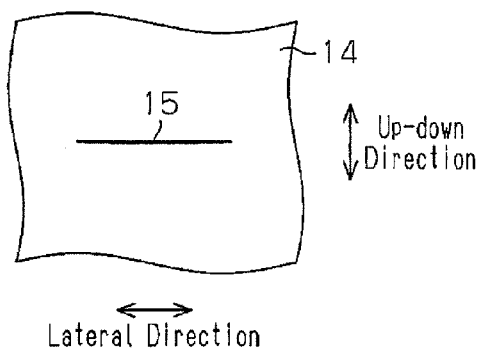
FIG. 9A is an enlarged front view illustrating a slit before restraint of an occupant.

In the first embodiment, tension that is strong in the lateral direction tends to be applied to the respective slits 15, and the respective slits 15 extend in the lateral direction. Due to this, upon the deployment and inflation of the upstream inflation portion 12 in an initial stage of the deployment and inflation of the airbag 10, the respective slits 15 are in a state of being substantially closed by the tension in the lateral direction (state illustrated in FIG. 9A). At this time, the inflation gas in the upstream inflation portion 12 flows into the downstream inflation portion 13 via the slits 15, however, due to the flow rate thereof being scarce, the inflation gas is retained in the upstream inflation portion 12. Due to this, the internal pressure of the upstream inflation portion 12 is increased first, and the upstream inflation portion 12 is deployed and inflated thereby.

Figure 9B:
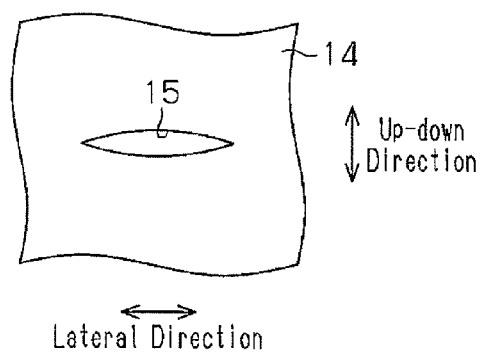
FIG. 9B is an enlarged front view illustrating the slit during restraint of an occupant.

When the airbag 10 (see FIG. 5) is deployed and inflated, and the occupant P is restrained by the airbag 10, an external force (pressing force by the occupant P, and pressing force by the body side portion 6) acts on the airbag 10 by the restraint. Due to this external force, the fabric sheet 11 of the airbag 10 is warped such that a width of the airbag 10 in the vehicle lateral direction becomes narrowed. At this time, since the partitioning member 14 (FIG. 8) also warps in the vehicle lateral direction (lateral direction), the tension in the lateral direction on the partitioning member 14 is decreased. Due to this, the force to close the respective slits 15 becomes small, and the force to open the respective slits 15 by the tension in the vertical direction becomes relatively stronger. Then, the respective slits 15 are opened (state illustrated in FIG. 9B). Due to this, since the amount of the inflation gas flowing into the downstream inflation portion 13 from the upstream inflation portion 12 via the respective slits 15 rapidly increases, the downstream inflation portion 13 is promptly deployed and inflated thereafter.

Accordingly, in the first embodiment, the respective slits 15 are opened by the external force applied to the airbag 10 accompanying the restraint of the occupant P by the airbag 10. Thus, compared to before the restraint of the occupant P by the airbag 10, the flow rate of the inflation gas from the upstream inflation portion 12 to the downstream inflation portion 13 is increased.

In the first embodiment, the respective slits 15 are formed at portions other than the wide portion D (portion illustrated by the slanting lines in FIG. 8), which is the widest in the vehicle lateral direction in the partitioning portion that actually partitions the upstream inflation portion 12 and the downstream inflation portion 13 of the partitioning member 14.

The wide portion D is a portion that approaches closest to the occupant P upon the deployment and inflation of the airbag 10 (FIG. 5), and is a portion of the largest deforming amount of the airbag 10 (more specifically, the fabric sheet 11 and the partitioning member 14) when the occupant P is restrained by the airbag 10. Due to this, the external force acting on the airbag 10 accompanying the restraint of the occupant P becomes largest in the wide portion D. Thus, the decreasing amount of the tension in the vehicle lateral direction (lateral direction) caused by the restraint of the occupant P by the airbag 10 is large at the wide portion D. Due to this, by providing a slit at such a wide portion D, it is possible to increase the opening amount of the slit and to reliably open the slit.

On the other hand, in the case of providing a slit to the wide portion D, it would be difficult to keep the opening amount of the slit small. This may restrict free settings of manners of deployment and inflation of the respective inflation portions 12, 13 (specifically, speed of deployment and inflation of the upstream inflation portion 12, the timing to start the deployment of the downstream inflation portion 13, and the speed of deployment and inflation thereof). Thus, there is a risk of not being able to address to demands in the manners of deployment of the respective inflation portions 12, 13 of the airbag 10.

In this respect, in the first embodiment, the respective slits 15 are formed at the portions other than the wide portion D (portion illustrated by the slanting lines in FIG. 8) in the partitioning member 14 of the airbag 10. Due to this, the external force acting on the slits 15 becomes small compared to an apparatus in which a slit is formed in the wide portion D, where the external force applied to the airbag 10 accompanying the restraint of the occupant P is the largest. Due to this, according to the apparatus of the first embodiment, it becomes possible, for example, to delay the increasing timing of the flow rate of the inflation gas to the downstream inflation portion 13, and to make an increase of the aforementioned flow rate to be small.

Moreover, by setting the positions of the respective slits 15 by taking the external force into consideration, the external force acting on peripheries of the slits 15 of the partitioning member 14 can be adjusted to a suitable magnitude. For example, without having to change the shape of the slits, the amount of the inflation gas flowing into the downstream inflation portion 13 from the upstream inflation portion 12 via the slits can be changed by changing the positions of the slits. It is possible to make the amount of the inflation gas flowing in via the slits large by forming the slits at a portion where the external force is large, and small by forming the slits at a portion where the external force is small.

As described above, according to the first embodiment, the flow rate of the inflation gas from the upstream inflation portion 12 to the downstream inflation portion 13 can be freely set, and the manners of deployment and inflation of the respective inflation portions 12, 13 can be freely set.

As described above, the first embodiment has the following advantages.

(1) The slits 15 are formed at the portions other than the wide portion D, where the external force being applied accompanying the restraint of the occupant P is the largest within the partitioning member 14. Due to this, the flow rate of the inflation gas from the upstream inflation portion 12 to the downstream inflation portion 13 can be freely set, and the manners of deployment and inflation of the respective inflation portions 12, 13 can be freely set.

(2) The slits 15 are formed in the partitioning member 14. Due to this, it is possible to make the flow rate of the inflation gas from the upstream inflation portion 12 to the downstream inflation portion 13 to be extremely small before the restraint of the occupant P by the airbag 10. Further, upon the restraint of the occupant P by the airbag 10, the flow rate of the inflation gas from the upstream inflation portion 12 to the downstream inflation portion 13 can be increased.

Second Embodiment

An airbag apparatus according to a second embodiment will be described by focusing on differences from the first embodiment. Like or the same reference numerals are given to those components that are like or the same as the corresponding components of the first embodiment, and detailed explanations are omitted.

The second embodiment and the first embodiment differ in their partitioning members, which partition the upstream inflation portion 12 and the downstream inflation portion 13.

Partitioning members of the second embodiment will be described below.

Figure 10:
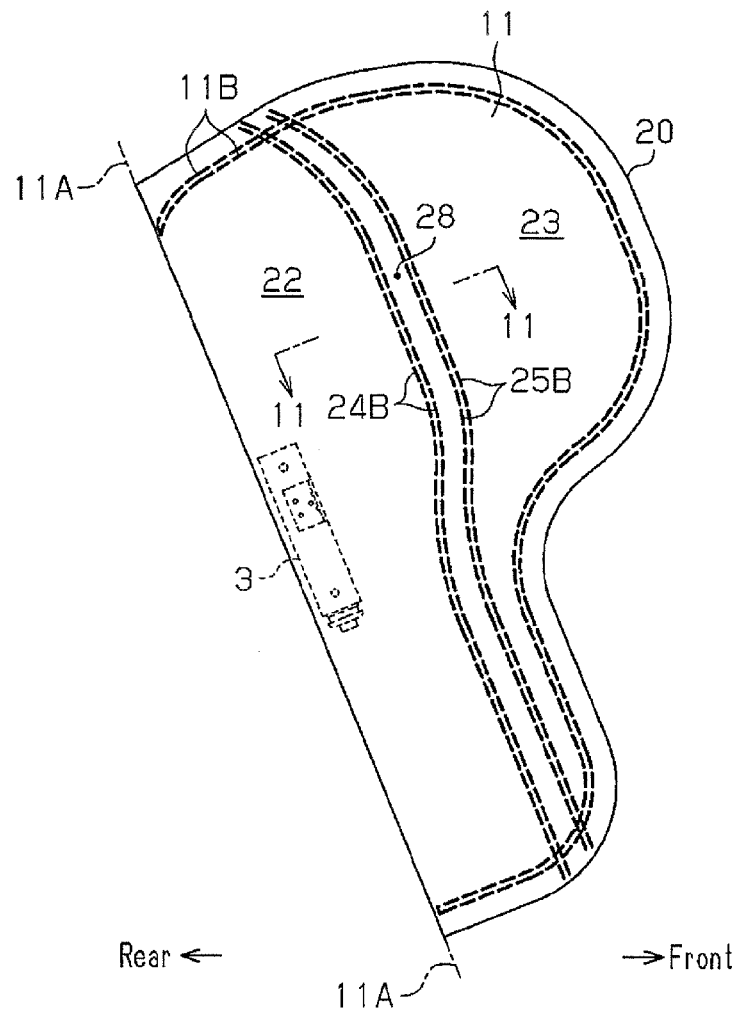
FIG. 10 is a side view illustrating an airbag in a non-inflated state according to a second embodiment.
Figure 11:
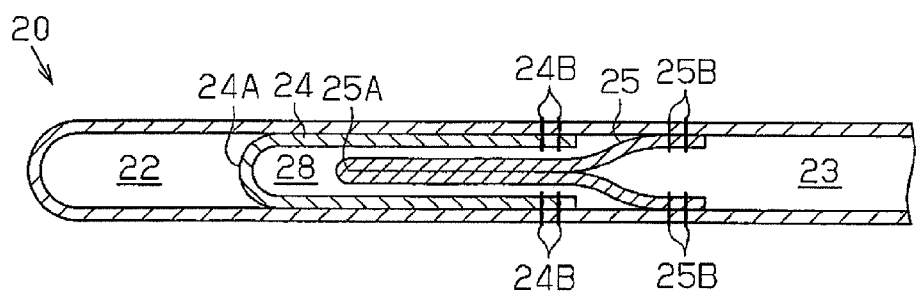
FIG. 11 is a cross-sectional view of the airbag taken along line 11-11 of FIG. 10.

FIG. 10 illustrates a side structure of an airbag 20 of the second embodiment in a non-inflated state, and FIG. 11 illustrates a cross-sectional structure of the airbag 20 along line 11-11 in FIG. 10. In FIG. 10, a line expressed by intermittently aligning thick lines with a certain length (one type of broken line) illustrates a state of a sewing thread on an outer surface of a fabric sheet 11 sewn by a sewing thread.

As shown in FIG. 10 and FIG. 11, the airbag 20 has two partitioning members (a first partitioning member 24, a second partitioning member 25) that partition the inside of the airbag 20 into an upstream inflation portion 22 on a rear side and a downstream inflation portion 23 on a front side attached thereto. Inside the airbag 20, the first partitioning member 24 is located upstream of the second partitioning member 25. Each of the first partitioning member 24 and the second partitioning member 25 is formed of a woven fabric that is the same material to the fabric sheet 11. Each of the first partitioning member 24 and the second partitioning member 25 is joined to the fabric sheet 11 by its peripheral portions being sewn. Each of the partitioning members 24, 25 has the same structure as a member generally referred to as a tether.

Each of the partitioning members 24, 25 is sewn onto the fabric sheet 11 to extend with a certain interval with one another upon being tensed by being deployed in a substantially planar shape inside the airbag 20. Specifically, a seam 24B of the first partitioning member 24 and a seam 25B of the second partitioning member 25 in the fabric sheet 11 extend with a substantially constant interval.

As shown in FIG. 11, each of the partitioning members 24, 25 is attached to the inside of the airbag 20 in a state of being folded into half at folding lines 24A, 25A when the airbag 20 is in a non-inflated state. When inflation gas is supplied by an inflator 3 and the airbag 20 is deployed and inflated, the respective partitioning members 24, 25 are tensed by being deployed in substantially planar shapes to partition the upstream inflation portion 22 and the downstream inflation portion 23.

A planar structure of the first partitioning member 24 is illustrated in FIG. 12A, and a planar structure of the second partitioning member 25 is illustrated in FIG. 12B. Broken lines in FIGS. 12A and 12B illustrate positions of the seams where the respective partitioning members 24, 25 are sewn to an outer wall of the airbag 20, that is, the fabric sheet 11.

As shown in FIG. 12A, one first slit 26 (linear cut) is formed on the first partitioning member 24. The first slit 26 is formed in a shape that extends linearly in a vehicle lateral direction upon the deployment of the first partitioning member 24. The first slit 26 is formed at a position that is higher than a wide portion D in a portion that actually partitions the upstream inflation portion 22 and the downstream inflation portion 23 in the first partitioning member 24. The wide portion D is illustrated by a slanting line portion in FIG. 12A, and is a portion that is the widest in the vehicle lateral direction in the portion that actually partitions the upstream inflation portion 22 and the downstream inflation portion 23 in the first partitioning member 24.

As shown in FIG. 12B, one second slit 27 (linear cut) is formed on the second partitioning member 25. The second slit 27 is formed in a shape that extends linearly in the vehicle lateral direction upon the deployment of the second partitioning member 25. The second slit 27 is formed at a position that is lower than a wide portion D in a portion that actually partitions the upstream inflation portion 22 and the downstream inflation portion 23 in the second partitioning member 25. The wide portion D is illustrated by a slanting line portion in FIG. 12B, and is a portion that is the widest in the vehicle lateral direction in the portion that actually partitions the upstream inflation portion 22 and the downstream inflation portion 23 in the second partitioning member 25. In the second embodiment, the respective slits 26, 27 function as a gas inlet portion.

Operation

Operation of the first partitioning member 24 and the second partitioning member 25 inside the airbag 20 will now be described.

In an apparatus of the second embodiment, when the inflation gas is generated by the inflator 3 being activated, the upstream inflation portion 22 is deployed and inflated first. The first partitioning member 24 is tensed by being deployed in the substantially planar shape accompanying an increase in the internal pressure of the upstream inflation portion 22.

As illustrated in FIG. 12A, a length L3 in a vertical direction (up and down direction) of the portion that actually partitions the upstream inflation portion 22 and the downstream inflation portion 23 of the first partitioning member 24 is longer than a length L4 thereof in a lateral direction (vehicle lateral direction) (L3>L4). Due to this, in the first partitioning member 24, in the state of being tensed by being deployed in the substantially planar shape, tension acting in the lateral direction (vehicle lateral direction) tends to be strong relative to tension acting in the vertical direction (up and down direction). In the first partitioning member 24, the first slit 26 extends in the lateral direction. Due to this, the tension in the vertical direction acts to open the first slit 26, whereas the tension in the lateral direction acts to close the first slit 26.

In the second embodiment, tension that is strong in the lateral direction tends to be applied to the first slit 26 of the first partitioning member 24, and the first slit 26 extends in the lateral direction. Due to this, upon the deployment and inflation of the upstream inflation portion 22 in an initial stage of the deployment and inflation of the airbag 20, the first slit 26 is in a state of being substantially closed by the tension in the lateral direction. At this time, the inflation gas in the upstream inflation portion 22 flows into an intermediate communication portion 28 (see FIG. 11) between the first partitioning member 24 and the second partitioning member 25 via the first slit 26, however, due to the flow rate thereof being scarce, the inflation gas is retained in the upstream inflation portion 12. Due to this, the internal pressure of the upstream inflation portion 22 is increased first, and the upstream inflation portion 22 is deployed and inflated thereby.

Thereafter, when the airbag 20 is deployed and inflated, and the occupant P is restrained by the airbag 20, an external force (pressing force by an occupant P, and pressing force by a body side portion 6) acts on the airbag 20 by the restraint. Due to this external force, the fabric sheet 11 of the airbag 20 is warped such that a width of the airbag 20 in the vehicle lateral direction becomes narrowed. At this time, since the first partitioning member 24 (see FIG. 12A) also warps in the vehicle lateral direction (lateral direction), the tension in the lateral direction on the first partitioning member 24 is decreased. Due to this, the force to close the first slit 26 becomes small, and the force to open the first slit 26 by the tension in the vertical direction becomes relatively stronger. Then, the first slit 26 is opened. Due to this, the amount of the inflation gas flowing into the intermediate communication portion 28 from the upstream inflation portion 22 via the first slit 26 rapidly increases.

As illustrated in FIG. 12B, as for the second partitioning member 25 also, similar to the first partitioning member 24, a length L5 in the vertical direction (up and down direction) of the portion that actually partitions the upstream inflation portion 22 and the downstream inflation portion 23 is longer than a length L6 thereof in the lateral direction (vehicle lateral direction) (L5>L6). Due to this, in the second partitioning member 25, in the state of being tensed by being deployed in the substantially planar shape, tension acting in the lateral direction tends to be strong relative to tension acting in the vertical direction (up and down direction). Further, the second slit 27 of the second partitioning member 25 extends in the lateral direction, similar to the first slit 26 of the first partitioning member 24. Due to this, the tension in the lateral direction acting on the first partitioning member 24 acts to close the first slit 26, and the tension in the lateral direction acting on the second partitioning member 25 acts to close the second slit 27.

When the first partitioning member 24 warps in the vehicle lateral direction, the occupant P is restrained by the airbag 20, and the external force accompanying the restraint of the occupant P is applied to the airbag 20. This external force is applied not only to the first partitioning member 24 but also to the second partitioning member 25, and decreases the tension in the lateral direction on the second partitioning member 25. Due to this, the second slit 27 of the second partitioning member 25 is opened by the tension in the up and down direction acting on the second partitioning member 25. Accordingly, the inflation gas that has flowed into the intermediate communication portion 28 via the first slit 26 of the first partitioning member 24 flows into the downstream inflation portion 23 via the second slit 27 of the second partitioning member 25. Due to this, since the amount of the inflation gas flowing into the downstream inflation portion 23 rapidly increases, the downstream inflation portion 23 is promptly inflated.

FIG. 13 schematically illustrates the internal structure and flow of the inflation gas of the airbag 20 upon the inflation of the downstream inflation portion 23.

As shown in FIG. 13, in deploying and inflating the airbag 20, the inflation gas flows into the downstream inflation portion 23 from the upstream inflation portion 22. At this time, the inflation gas firstly passes through the first slit 26 formed in the first partitioning member 24, and thereafter passes through the second slit 27 formed on the second partitioning member 25. In the apparatus of the second embodiment, as is apparent from FIG. 13, the position of the second slit 27 of the second partitioning member 25 (see FIG. 12B) is offset from the position of the first slit 26 of the first partitioning member 24 (see FIG. 12A). That is, the second slit 27 is located at a portion other than a portion to which the flow of the inflation gas flowing inside the intermediate communication portion 28 via the first slit 26 is directed. Due to this, the direction of the flow of the inflation gas is significantly changed between the first partitioning member 24 and the second partitioning member 25, that is, inside the intermediate communication portion 28. Due to this, the flow velocity of the inflation gas is decreased. Thus, according to the apparatus of the second embodiment, the inflow velocity of the inflation gas from the upstream inflation portion 22 to the downstream inflation portion 23 can be reduced for adjusting the amount of the inflation gas that flows into the downstream inflation portion 23 from the upstream inflation portion 22 upon the restraint of the occupant P by the airbag 20.

Accordingly, in the second embodiment, upon the restraint of the occupant P by the airbag 20, the first slit 26 of the first partitioning member 24 and the second slit 27 of the second partitioning member 25 are opened together by the external force applied to the airbag 20 accompanying the restraint. Due to this, the flow rate of the inflation gas from the upstream inflation portion 22 to the downstream inflation portion 23 increases compared to before the restraint of the occupant P by the airbag 20.

Further, in the second embodiment, the respective slits 26 and 27 are formed at the portions other than the wide portion D in the respective partitioning members 24, 25.

The wide portion D is a portion that approaches closest to the occupant P upon the deployment and inflation of the airbag 20, and is a portion of the largest deforming amount of the airbag 20 (more specifically, the fabric sheet 11 and the respective partitioning members 24, 25) when the occupant P is restrained by the airbag 20. Due to this, the external force acting on the airbag 20 accompanying the restraint of the occupant P becomes largest in the wide portion D. Thus, a decreasing amount of the tension in the vehicle lateral direction (lateral direction) caused by the restraint of the occupant P by the airbag 20 is large at the wide portion D. Due to this, by providing a slit at such a wide portion D, it is possible to increase the opening amount of the slit and to reliably open the slit.

On the other hand, in the case of providing the slit to the wide portion D, it is difficult to keep the opening amount of the slit small. This may restrict free settings of manners of deployment and inflation of the respective inflation portions 22, 23 (specifically, speed of deployment and inflation of the upstream inflation portion 22, the timing to start the deployment of the downstream inflation portion 23, and the speed of deployment and inflation thereof), so there is a risk of not being able to address to demands in the manners of deployment of the respective inflation portions 22, 23 of the airbag 20.

In this respect, in the second embodiment, the first slit 26 of the first partitioning member 24 and the second slit 27 of the second partitioning member 25 are formed respectively at the portions other than the wide portion D. Due to this, the external force acting on the first slit 26 of the first partitioning member 24 and the second slit 27 of the second partitioning member 25 becomes small compared to an apparatus in which a slit is formed in a wide portion D, where the external force applied to the airbag 20 accompanying the restraint of the occupant P is the largest. Due to this, according to the apparatus of the second embodiment, it is possible, for example, to delay the increasing timing of the flow rate of the inflation gas to the downstream inflation portion 23, and to reduce the increase in the aforementioned flow rate.

Moreover, by setting the positions of the first slit 26 of the first partitioning member 24 and the second slit 27 of the second partitioning member 25 by taking the external force into consideration, the external force acting on the periphery of the first slit 26 of the first partitioning member 24, or on the periphery of the second slit 27 of the second partitioning member 25 can be adjusted to a suitable magnitude. For example, without having to change the shape of the slits of the respective partitioning members 24, 25, the amount of the inflation gas flowing into the downstream inflation portion 23 from the upstream inflation portion 22 via the slits can be changed by changing the positions of the slits. It is possible to make the amount of the inflation gas flowing in via the slits large by forming the slits at a portion where the external force is large, and small by forming the slits at a portion where the external force is small.

As described above, according to the second embodiment, the flow rate of the inflation gas from the upstream inflation portion 22 to the downstream inflation portion 23 can be freely set, and the manners of deployment and inflation of the respective inflation portions 22, 23 can be freely set.

As described above, the second embodiment has the following advantages.

(3) In the first partitioning member 24, the first slit 26 is formed at the portion other than the wide portion D, where the external force applied accompanying the restraint of the occupant P is the largest. Further, in the second partitioning member 25, the second slit 27 is formed at the portion other than the wide portion D, where the external force applied accompanying the restraint of the occupant P is the largest. Due to this, the flow rate of the inflation gas from the upstream inflation portion 22 to the downstream inflation portion 23 can be freely set, and the manners of deployment and inflation of the respective inflation portions 22, 23 can be freely set.

(4) The second slit 27 of the second partitioning member 25 is formed at the portion other than the portion to which the flow of the inflation gas flowing in the intermediate communication portion 28 via the first slit 26 of the first partitioning member 24 is directed. Due to this, the direction of the flow of the inflation gas is significantly changed inside the intermediate communication portion 28, and the flow velocity of the inflation gas can be decreased. Thus, the inflow velocity of the inflation gas from the upstream inflation portion 22 to the downstream inflation portion 23 can be reduced for adjusting the amount of the inflation gas that flows into the downstream inflation portion 23 from the upstream inflation portion 22 upon the restraint of the occupant P by the airbag 20.

Third Embodiment

An airbag apparatus according to a third embodiment will be described by focusing on differences from the first and second embodiments. Like or the same reference numerals are given to those components that are like or the same as the corresponding components of the first and second embodiments, and detailed explanations are omitted.

The third embodiment is different from the first and second embodiments in the partitioning members, which partition an upstream inflation portion and a downstream inflation portion.

A partitioning member of the third embodiment will now be described.

Figure 14:
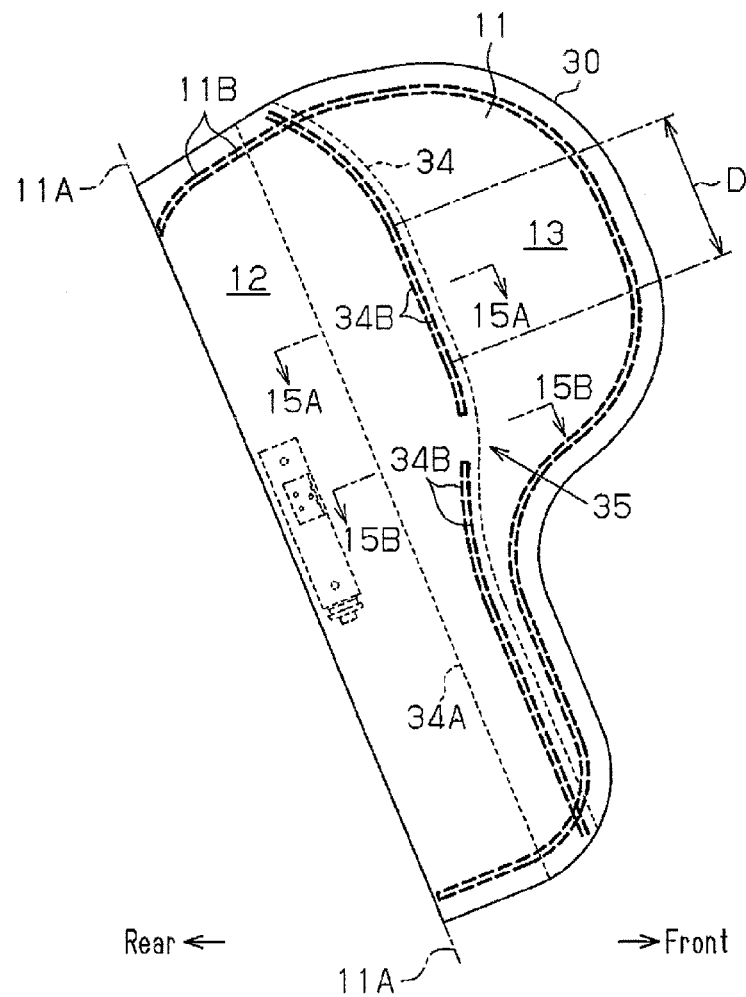
FIG. 14 is a side view illustrating an airbag in a non-inflated state according to a third embodiment.

FIG. 14 illustrates a side structure of an airbag 30 of the third embodiment in a non-inflated state. In FIG. 14, a line expressed by intermittently aligning thick lines with a certain length (one type of broken line) illustrates a state of a sewing thread on an outer surface of a fabric sheet 11 sewn by a sewing thread.

As shown in FIG. 14, the airbag 30 has a partitioning member 34 that partitions the inside of the airbag 30 into an upstream inflation portion 12 on a rear side and a downstream inflation portion 13 on a front side attached thereto. The partitioning member 34 is formed by a woven fabric that is the same material as the fabric sheet 11. The partitioning member 34 is joined to the fabric sheet 11 by parts of its peripheral portions being sewn along a joint portion, that is, a seam 34B. The seam 34B extends along a folding line 34C, and a part thereof is disconnected at non-joint portions 35. That is, at the non-joint portions 35, the peripheral portions of the partitioning member 34 are not joined to an outer wall of the airbag 30, that is, the fabric sheet 11. The partitioning member 34 has the same structure as a member generally referred to as a tether.

Figure 15A:
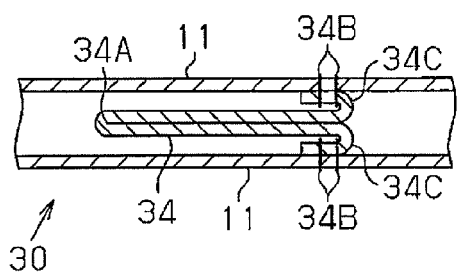
FIG. 15A is a cross-sectional view of the airbag of FIG. 14 taken along line 15A-15A.
Figure 15B:
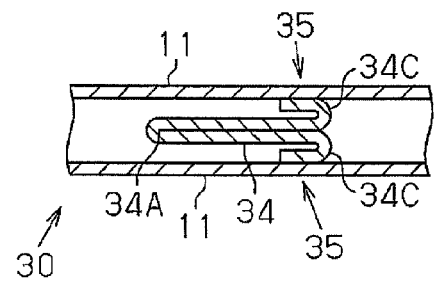
FIG. 15B is a cross-sectional view of the airbag of FIG. 14 taken along line 15B-15B.

FIG. 15A illustrates a cross-sectional structure of the airbag 30 along line 15A-15A in FIGS. 14, and 15B illustrates a cross-sectional structure of the airbag 30 along line 15B-15B in FIG. 14.

As shown in FIGS. 14 and 15A, the partitioning member 34 is located inside of the airbag 10 in a state of being folded in half at a folding line 34A when the airbag 30 is in a non-inflated state. Specifically, the folding line 34A of the partitioning member 34 is located on the rear side, and the peripheral portions of the partitioning member 34 are located on the front side. Further, the peripheral portions of the partitioning member 34 are folded toward the rear side along the folding line 34C, and a folded portion is sewn onto the fabric sheet 11 along a joint portion, that is, the seam 34B. In the third embodiment, the partitioning member 34 is joined to the fabric sheet 11 so that the peripheral portions of the partitioning member 34 extend toward the upstream inflation portion 12 (rear side) along an inner surface of the outer wall of the airbag 30 (that is, the fabric sheet 11).

As shown in FIGS. 14 and 15B, the non-joint portions 35 are formed below a wide portion D at a partitioning portion that actually partitions the upstream inflation portion 12 and the downstream inflation portion 13 in the partitioning member 34. The wide portion D is a portion that is the widest in a vehicle lateral direction in the partitioning portion that actually partitions the upstream inflation portion 12 and the downstream inflation portion 13 of the partitioning member 34. The non-joint portions 35 are formed at a position facing a flank of an occupant P at a portion of the fabric sheet 11 that deploys to face the occupant P, and are formed at a position that is somewhat separated from the body side portion 6 at a portion of the fabric sheet that deploys to face the body side portion 6. That is, in the third embodiment, the non-joint portions 35 are formed at a position that is unlikely to be directly pressed by the occupant P or the body side portion 6. In the third embodiment, the non-joint portions 35 operate as a gas inlet portion.

Operation

Operation of the non-joint portion 35 to the airbag 30 will now be described.

In the apparatus of the third embodiment, when the inflator 3 is activated and inflation gas is generated, the upstream inflation portion 12 is firstly deployed and inflated. The partitioning member 34 is tensed by being deployed in a substantially planar shape accompanying an increase in the internal pressure of the upstream inflation portion 12 to partition the upstream inflation portion 12 and the downstream inflation portion 13.

Figure 16:
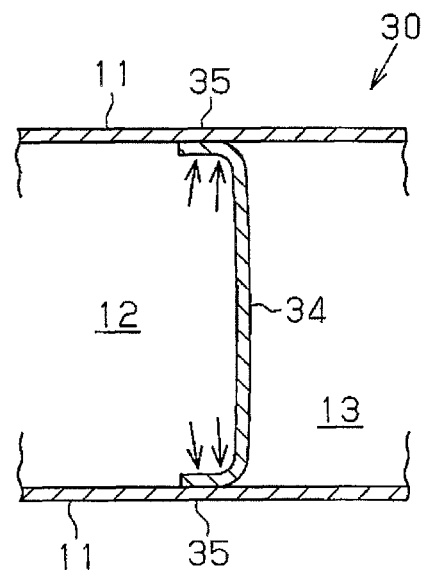
FIG. 16 is a cross-sectional view illustrating a non-joint portion of the airbag in a state in which a partitioning member is tensed by being deployed in a substantially planar shape.

FIG. 16 illustrates a cross-sectional structure of the airbag 30 in which the partitioning member 34 is tensed by being deployed in the substantially planar shape. FIG. 16 illustrates the cross-sectional structure of the airbag 30 corresponding to the cross section along line 15B-15B in FIG. 14.

As illustrated in FIG. 16, in the apparatus of the third embodiment, the partitioning member 34 is arranged such that the peripheral portions of the partitioning member 34 extend toward the upstream inflation portion 12 along the inner surface of the fabric sheet 11. Due to this, as shown by arrows in FIG. 16, the internal pressure of the upstream inflation portion 12 upon the inflation of the upstream inflation portion 12 acts to cause the peripheral portions of the partitioning member 34 to be pressed against the inner surface of the fabric sheet 11. At this time, the peripheral portions of the partitioning member 34 at the non-joint portions 35 are pressed against the inner surface of the fabric sheet 11. Thus, gaps between the partitioning member 34 and the fabric sheet 11 are blocked, whereby communication of the upstream inflation portion 12 and the downstream inflation portion 13 is cut off. Accordingly, the internal pressure of the upstream inflation portion 12 increases first, and the upstream inflation portion 12 is deployed and inflated.

Thereafter, when the airbag 30 is deployed and inflated and the occupant P is restrained by the airbag 30, an external force (pressing force by the occupant P, and pressing force by the body side portion 6) by the restraint is applied to the airbag 30. The fabric sheet 11 and the partitioning member 34 of the airbag 30 are warped by the external force. At this time, if the fabric sheet 11 is deformed toward outside of the airbag 30 or the partitioning member 34 is deformed toward inside of the airbag 30 at the non-joint portions 35, the gaps between the partitioning member 34 and the fabric sheet 11 at the non-joint portions 35 are expanded. In this case, the internal pressure in the upstream inflation portion 12 acts to press the peripheral portions of the partitioning member 34 into the gaps.

Figure 17:
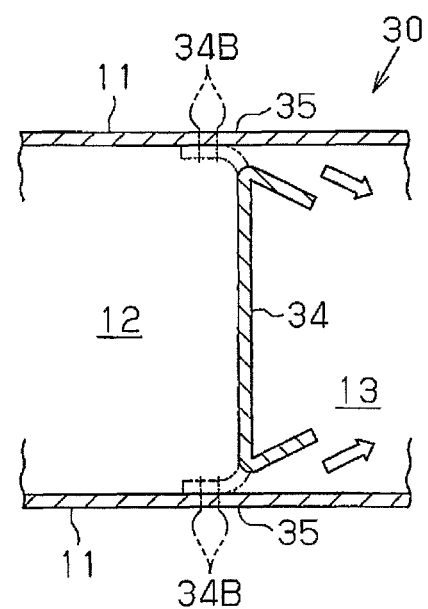
FIG. 17 is a cross-sectional view illustrating the non-joint portion of the airbag during restraint of an occupant.

As a result, as illustrated in FIG. 17, the peripheral portions of the partitioning member 34 at the non-joint portions 35 are pressed into the downstream inflation portion 13 by the internal pressure of the upstream inflation portion 12. Due to this, the expanded gaps between the peripheral portions of the partitioning member 34 and the fabric sheet 11 are formed and maintained, and inflow of the inflation gas from the upstream inflation portion 12 to the downstream inflation portion 13 is permitted. As shown by outline arrows in FIG. 17, since the inflation gas flows in from the upstream inflation portion 12 to the downstream inflation portion 13, the downstream inflation portion 13 is deployed and inflated thereby.

Accordingly, in the apparatus of the third embodiment, the non-joint portions 35, where the fabric sheet 11 and the partitioning member 34 of the airbag 30 are not joined are partially formed. Due to this, the communication of the upstream inflation portion 12 and the downstream inflation portion 13 is substantially shut off before the restraint of the occupant P by the airbag 30, whereas on the other hand is permitted upon the restraint of the occupant P.

In the third embodiment, the non-joint portions 35 are formed at the portions other than the wide portion D in the partitioning portion that actually partitions the upstream inflation portion 12 and the downstream inflation portion 13 of the partitioning member 34. The wide portion D is the portion that is the widest in the vehicle lateral direction in the partitioning portion that actually partitions the upstream inflation portion 12 and the downstream inflation portion 13 of the partitioning member 34.

The wide portion D is a portion that approaches closest to the occupant P upon the deployment and inflation of the airbag 30, and is a portion of the largest deforming amount of the airbag 30 (more specifically, the fabric sheet 11 and the partitioning member 34) when the occupant P is restrained by the airbag 30. Due to this, the external force acting on the airbag 30 accompanying the restraint of the occupant P becomes largest in the wide portion D.

By providing the non-joint portions 35 in such a wide portion D, it is possible to cause the peripheral portions of the partitioning member 34 to be reliably pressed in from the upstream inflation portion 12 to the downstream inflation portion 13 at the non-joint portions 35, and to advance the timing of such a press-in.

On the other hand, in the case of providing the non-joint portions 35 at the wide portion D, it is difficult to delay the timing to press in the peripheral portions of the partitioning member 34 from the upstream inflation portion 12 to the downstream inflation portion 13. Further, the wide portion D is a portion that is likely to be directly pressed by the occupant P or the body side portion 6. Thus, in the case of providing the non-joint portions 35 at the wide portion D, the pressing force thereof may act to cause the fabric sheet 11 to be pressed against the partitioning member 34. In this case, not only the timing to press in the peripheral portions of the partitioning member 34 from the upstream inflation portion 12 to the downstream inflation portion 13 becomes easily unstable, but also, the peripheral portions of the partitioning member 34 may not be pressed into the downstream inflation portion 13.

This may restrict the manners of deployment and inflation of the respective inflation portions 12, 13 (specifically, the deploying and inflating speed of the upstream inflation portion 12, the timing to start the deployment of the downstream inflation portion 13, the deploying and inflating speed thereof, and the like) from being freely set. Therefore, the demands for the manners of deployment and inflation of the respective inflation portions 12, 13 of the airbag 30 may not be sufficiently addressed.

In this respect, in the third embodiment, the non-joint portions 35 are formed at the portion other than the wide portion D. Since the external force applied to the airbag 30 accompanying the restraint of the occupant P becomes the largest at the wide portion D, the external force acting on the non-joint portions 35 becomes small compared to an apparatus in which the non-joint portions 35 are formed in the wide portion D. Due to this, the timing to start the inflow of the inflation gas into the downstream inflation portion 13 can be delayed by delaying the timing at which the peripheral portions of the partitioning member 34 are pressed in from the upstream inflation portion 12 to the downstream inflation portion 13. Further, increasing speed of the flow rate of the inflation gas can be slowed by slowing down the speed by which the peripheral portions of the partitioning member 34 are pressed into the downstream inflation portion 13. Moreover, the external force acting on the non-joint portions 35 can be adjusted to a suitable magnitude by setting the positions of the non-joint portions 35 by taking the external force into consideration. Due to this, according to the third embodiment, the flow rate of the inflation gas from the upstream inflation portion 12 to the downstream inflation portion 13 can be freely set, and the manners of deployment and inflation of the respective inflation portions 12, 13 can be freely set.

Further, in the third embodiment, the non-joint portions 35 are formed at the portion other than the wide portion D and where it is unlikely to be directly pressed by the occupant P or the body side portion 6. Thus, the fabric sheet 11 at the non-joint portions 35 is prevented from being directly pressed against the partitioning member 34 by the occupant P or the body side portion 6. Accordingly, the peripheral portions of the partitioning member 34 can be stably pressed in from the upstream inflation portion 12 to the downstream inflation portion 13 by the external force.

As described above, the third embodiment has the following advantages.

(5) The partitioning member 34 is joined to the fabric sheet 11 at the joint portion, that is, the seam 34B, in the manner by which the peripheral portions of the partitioning member 34 extend toward the upstream inflation portion 12 along the inner surface of the fabric sheet 11, and the partitioning member 34 is not joined to the fabric sheet 11 at the non-joint portions 35. Further, the non-joint portions 35 are formed at the portion other than the wide portion D, where the external force applied to the airbag 30 accompanying the restraint of the occupant P is the largest. Due to this, the flow rate of the inflation gas from the upstream inflation portion 12 to the downstream inflation portion 13 can be freely set, and the manners of deployment and inflation of the respective inflation portions 12, 13 can be freely set.

(6) The fabric sheet 11 and the partitioning member 34 of the airbag 30 are not joined at the non-joint portions. Due to this, the communication of the upstream inflation portion 12 and the downstream inflation portion 13 can be substantially shut off before the restraint of the occupant P by the airbag 30, and can be permitted upon the restraint of the occupant P.

Other Embodiments

The above embodiment may be modified as follows.

In the first embodiment or the second embodiment, a pressure regulating valve may be provided instead of providing the slits in the partitioning member. The pressure regulating valve is closed by the tension acting on the partitioning member in the lateral direction (vehicle lateral direction) thereof before the restraint of the occupant P by the airbag, whereas on the other hand is opened upon the restraint of the occupant P by the airbag by the decrease in the tension caused by the partitioning member being warped by the external force applied accompanying the restraint.

Figure 18:
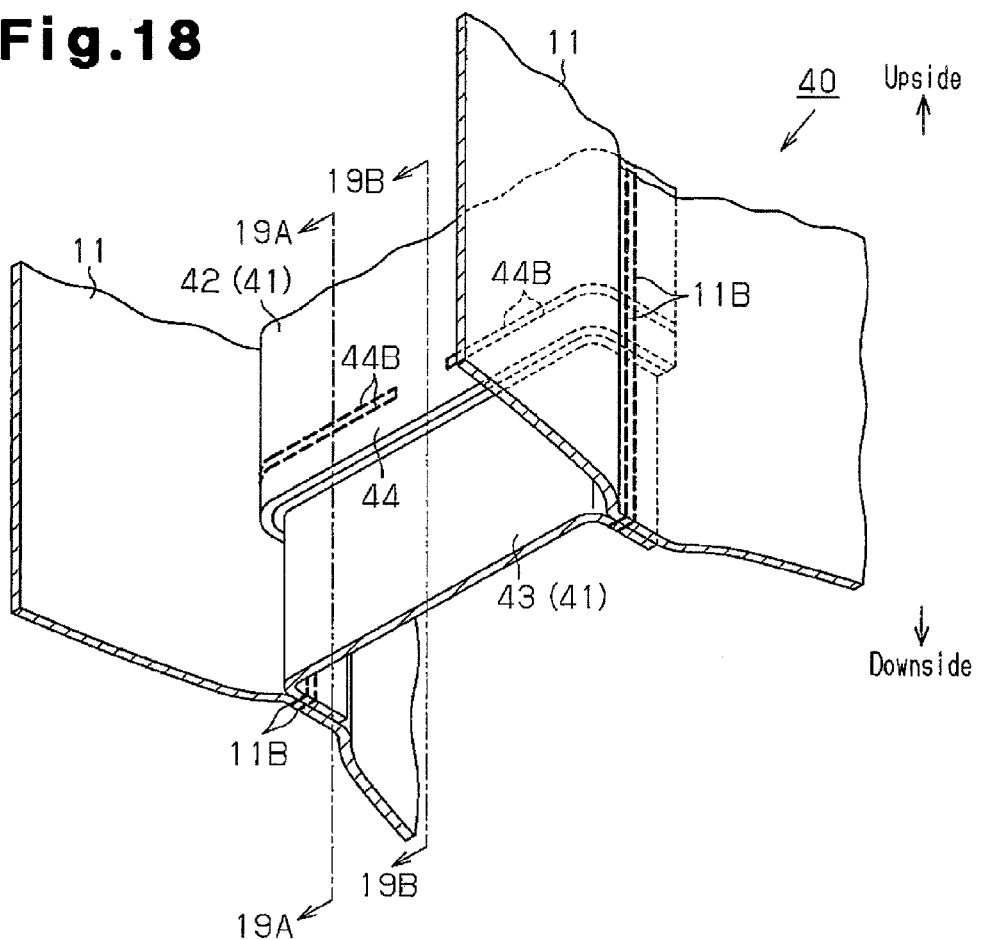
FIG. 18 is a perspective view illustrating a pressure regulating valve according to another embodiment in enlargement.
Figure 19A:
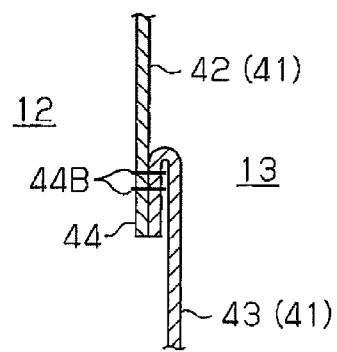
FIG. 19A is a cross-sectional view illustrating the pressure regulating valve of FIG. 18 taken along line 19A-19A.
Figure 19B:
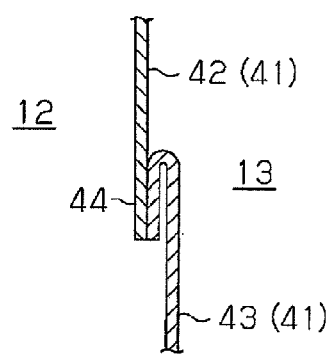
FIG. 19B is a cross-sectional view illustrating the pressure regulating valve of FIG. 18 taken along line 19B-19B.

An example of such a pressure regulating valve will be described with reference to FIGS. 18 and 19. FIG. 18 illustrates a perspective structure of the airbag in a periphery of the pressure regulating valve. FIG. 19A illustrates a cross-sectional structure of the partitioning member along line 19A-19A in FIG. 18. FIG. 19B illustrates a cross-sectional structure of the partitioning member along line 19B-19B in FIG. 18.

As illustrated in FIGS. 18, 19A, and 19B, a partitioning member 41 is formed by an upper member 42 arranged on an upper side and a lower member 43 arranged on a lower side. A distal end on the lower side of the upper member 42 and a distal end on the upper side of the lower member 43 are overlapped in a thickness direction, and an overlapping portion 44 where they are overlapped is sewn along two seams 44B extending parallel to one another. The seams 44B extend linearly from one end to the other end of the partitioning member 41 in a lateral direction, and their intermediate portions are disconnected. Further, the overlapping portion 44 is folded downward in a manner extending along a surface of the lower member 43 facing an upstream inflation portion 12. Further, the overlapping portion 44 operates as the pressure regulating valve. In the embodiment illustrated in FIGS. 18 and 19, the seams 44B for sewing the overlapping portion 44 are set with starting points at positions on an outer side in a vehicle lateral direction than seams 11B for sewing the partitioning member 41 and a fabric sheet 11. However, not limitation is made hereto, and the seams 44B for sewing the overlapping portion may be set with the starting points at the seams 11B for sewing the partitioning member 41 and the fabric sheet 11.

Operation of such a pressure regulating valve will now be described.

Figure 20A:
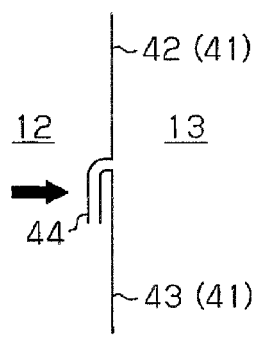
FIGS. 20A to 20C are schematic diagrams showing operation of the pressure regulating valve of FIG. 18.

As illustrated in FIG. 20A, before the restraint of the occupant P by the airbag 40, the tension in the lateral direction acting on the partitioning member 41 acts to close the overlapping portion 44 between the upper member 42 and the lower member 43, and the internal pressure of the upstream inflation portion 12 (see an arrow in the drawing) acts to press the upper member 42 against the lower member 43 in tight contact at the overlapping portion 44. Due to this, a gap is not formed in the overlapping portion 44 at this time (more specifically, between the upper member 42 and the lower member 43), and thus, inflow of the inflation gas from the upstream inflation portion 12 to the downstream inflation portion 13 is suppressed.

Figure 20B:
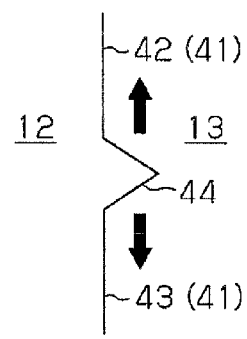

Thereafter, as illustrated in FIG. 20B, when the occupant P is restrained by the airbag 40, since the tension in the lateral direction acting on the partitioning member 41 decreases, tension in a vertical direction (see arrows in the drawing) acting on the partitioning member 41 causes the upper member 42 and the lower member 43 to separate at their overlapping portion 44. Then, by the internal pressure of the upstream inflation portion 12 at this time, the overlapping portion 44 comes to be in a state of being inside out, and being pressed into the downstream inflation portion 13 from within the upstream inflation portion 12.

Figure 20C:
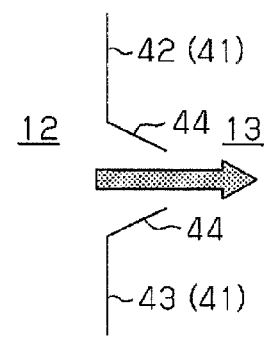

As shown in FIG. 20C, since the flow of the inflation gas in the upstream inflation portion 12 acts to open the overlapping portion 44 that is in the inside-out state, the inflation gas flows in from the upstream inflation portion 12 to the downstream inflation portion 13 via the gap between the upper member 42 and the lower member 43 that has been opened thereby. Due to this, the downstream inflation portion 13 is deployed and inflated.

Figure 21:
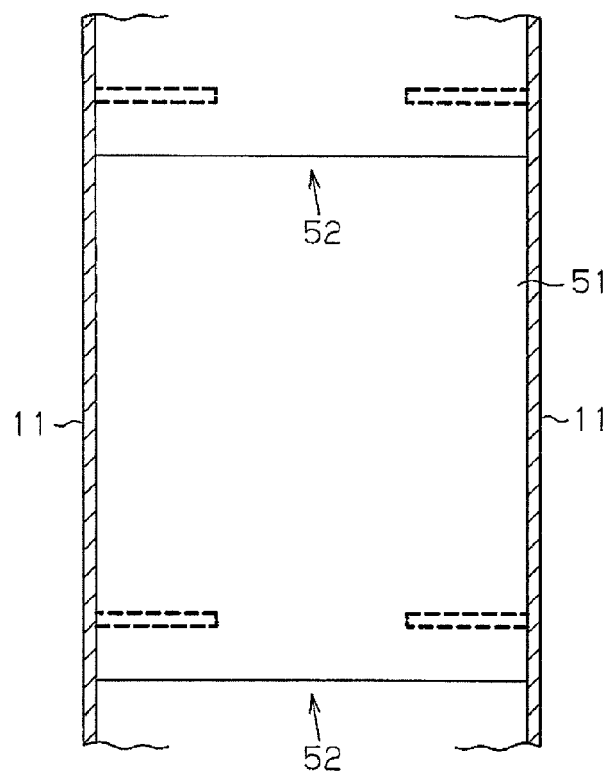
FIG. 21 is a front view showing a planar structure of a pressure regulating valve according to a modification.

A plurality of pressure regulating valves may be provided in one partitioning member. In such an apparatus, it is only necessary to provide at least one of the pressure regulating valves at a portion other than a wide portion D (for example, see the portion shown by the slanting lines in FIG. 8). In an example illustrated in FIG. 21, two pressure regulating valves 52 are provided for one partitioning member 51. According to such an apparatus, the flow rate of the inflation gas from an upstream inflation portion to a downstream inflation portion can be adjusted through an opening manner and the position of each pressure regulating valve 52; thus, compared to an apparatus in which only one pressure regulating valve is provided, the flow rate of the inflation gas can be more freely adjusted.

The pressure regulating valve provided in the partitioning member is not limited to the structure shown in FIGS. 18 and 19, and may have any of structures illustrated, for example, in FIGS. 22 to 31. The pressure regulating valve can have any arbitrary structure as long as it can restrict inflow of inflation gas from an upstream inflation portion to a downstream inflation portion before restraint of an occupant by an airbag, and can cancel the restriction upon the restraint of the occupant by the airbag.

Figure 22:
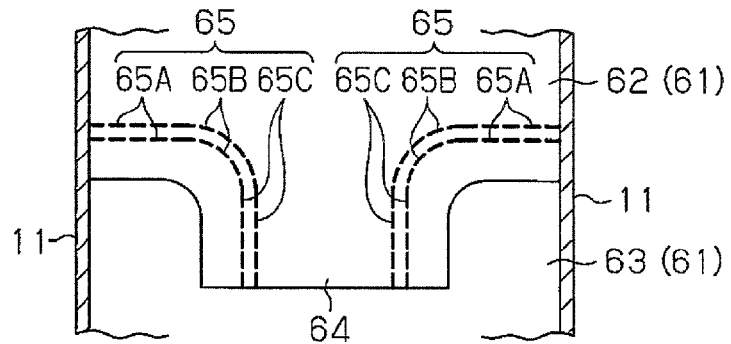
FIG. 22 is a front view showing a planar structure of a pressure regulating valve according to a modification.

In the example illustrated in FIG. 22, seams 65 sewing an overlapping portion 64 of an upper member 62 and a lower member 63 of a partitioning member 61 are set in a shape having portions 65A extending from both end portions toward a central portion respectively in a lateral direction (vehicle lateral direction) of the partitioning member 61, portions 65B curving toward a distal end of the overlapping portion 64 with distal ends of the portions 65A as starting points, and portions 65C extending in parallel with an interval with distal ends of the portions 65B as starting points. Further, in this example, the end portion of the overlapping portion 64 is formed in a shape extending along the seams 65.

Figure 23:
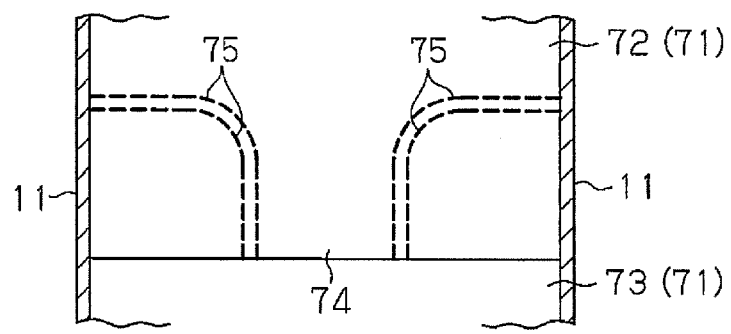
FIG. 23 is a front view showing a planar structure of a pressure regulating valve according to a modification.

In the example illustrated in FIG. 23, seams 75 that sew an overlapping portion 74 of an upper member 72 and a lower member 73 of a partitioning member 71 are set in the same shape as the seams in the example of FIG. 22. On the other hand, a distal end of the overlapping portion 74 is formed in a shape that extends linearly in a lateral direction.

Figure 24:
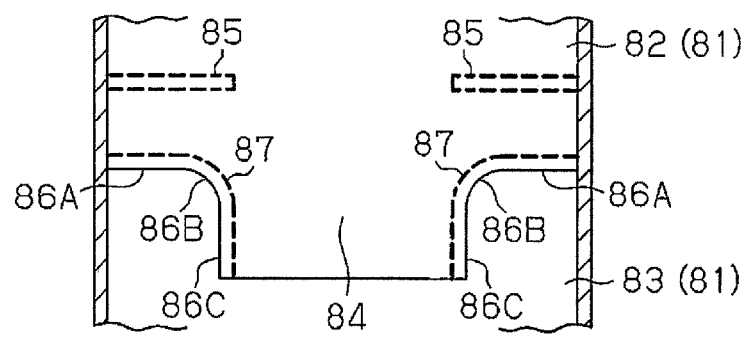
FIG. 24 is a front view showing a planar structure of a pressure regulating valve according to a modification.

In the example illustrated in FIG. 24, seams 85 that sew an overlapping portion 84 of an upper member 82 and a lower member 83 of a partitioning member 81 extend linearly from one end to the other end in a lateral direction of the partitioning member, and an intermediate portion thereof is disconnected. Further, a distal end of the overlapping portion 84 of the upper member 82 and the lower member 83 includes portions 86A extending from both end portions toward a central portion respectively in a lateral direction of the partitioning member 81, portions 86B curving downward with distal ends of the portions 86A as starting points, and portions 86C extending downward in parallel with an interval with distal ends of the portions 86B as starting points. The distal end of the overlapping portion 84 is sewn along the respective portions 86A, 86B, 86C at seams 87.

Figure 25:
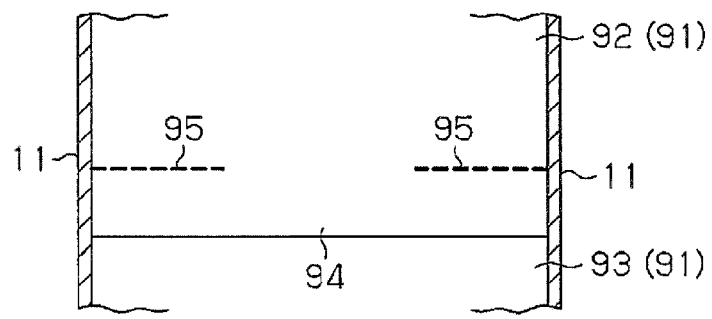
FIG. 25 is a front view showing a planar structure of a pressure regulating valve according to a modification.
Figure 26:
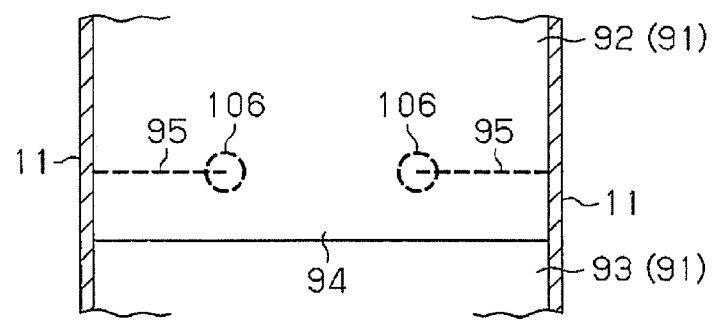
FIG. 26 is a front view showing a planar structure of a pressure regulating valve according to a modification.
Figure 27:
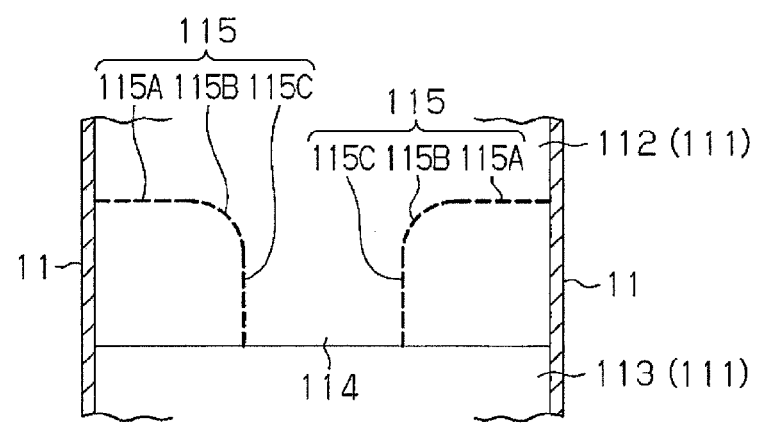
FIG. 27 is a front view showing a planar structure of a pressure regulating valve according to a modification.

Not limiting to sewing at two seams extending in parallel in an overlapping portion, sewing may be performed by one seam, as illustrated in FIGS. 25 to 27.

In the example illustrated in FIG. 25, a seam 95 that sews an overlapping portion 94 of an upper member 92 and a lower member 93 of a partitioning member 91 extends linearly from one end to the other end in a lateral direction of the partitioning member 91, and an intermediate portion is disconnected.

In the example illustrated in FIG. 26, as a seam that sews an overlapping portion 94 of an upper member 92 and a lower member 93, in addition to a seam 95 in the same shape as the example shown in FIG. 25, seams 106 that extend in a circular shape fully encircling end portions of the seam 95 on a central portion side are set.

In the example illustrated in FIG. 27, a seam 115 that sews an overlapping portion 114 of an upper member 112 and a lower member 113 of a partitioning member 111 includes portions 115A extending from both end portions toward a central portion respectively in a lateral direction of the partitioning member 111, portions 115B curving toward a distal end of the overlapping portion 114 with distal ends of the portions 115A as starting points, and portions 115C extending in parallel with an interval with distal ends of the portions 115B as starting points.

Figure 28:
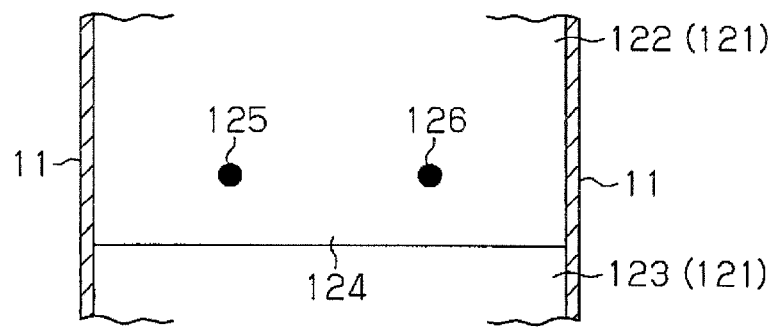
FIG. 28 is a front view showing a planar structure of a pressure regulating valve according to a modification.

In the example illustrated in FIG. 28, an overlapping portion 124 of an upper member 122 and a lower member 123 of a partitioning member 121 is sewn at two dot-shaped joint portions 125, 126 that are spaced apart from one another.

Figure 29:
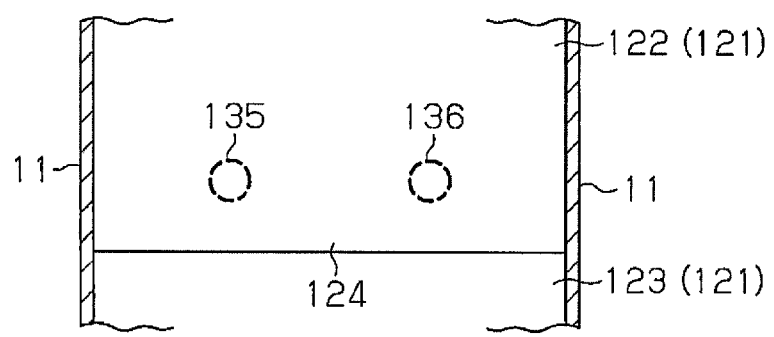
FIG. 29 is a front view showing a planar structure of a pressure regulating valve according to a modification.

In the example illustrated in FIG. 29, an overlapping portion 124 of an upper member 122 and a lower member 123 is sewn respectively along two seams 135, 136 that are arranged by being spaced apart from one another and extend in a circular shape.

Figure 30:
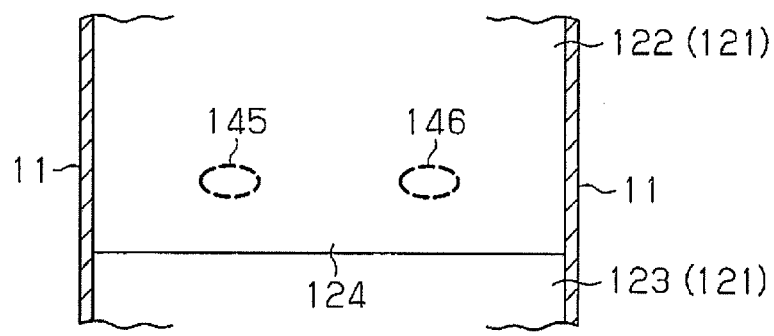
FIG. 30 is a front view showing a planar structure of a pressure regulating valve according to a modification.

In the example illustrated in FIG. 30, an overlapping portion 124 of an upper member 122 and a lower member 123 is sewn respectively along two seams 145, 146 that are arranged to be spaced apart from one another and extend in an oval shape.

Figure 31:
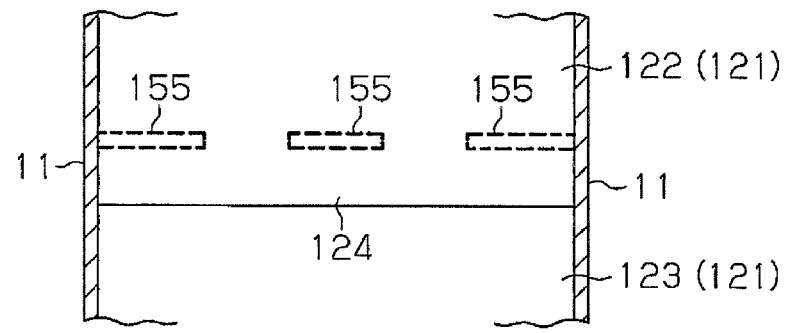
FIG. 31 is a front view showing a planar structure of a pressure regulating valve according to a modification.

In the example illustrated in FIG. 31, a seam 155 that sews an overlapping portion 124 of an upper member 122 and a lower member 123 is set in a shape that extends linearly from one end to the other end in a lateral direction of a partitioning member 121, and has an intermediate portion being disconnected at two portions.

Figure 32:
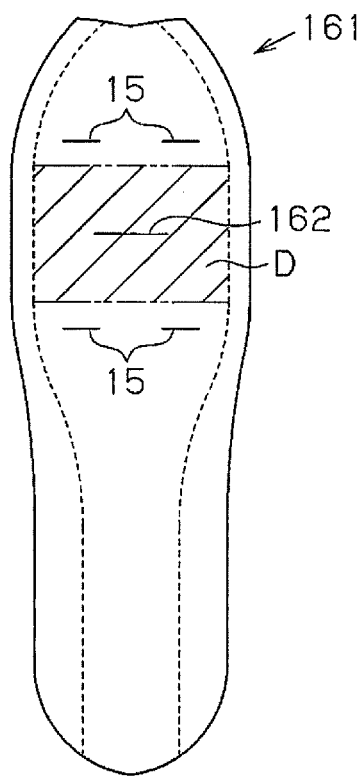
FIG. 32 is a front view showing a planar structure of a partitioning member according to another embodiment.

In the first embodiment, not limited to forming the slits 15 at the portions other than the wide portion D, where the external force that acts on the airbag 10 accompanying the restraint of the occupant P becomes the largest, as an example of a partitioning member 161 being illustrated in FIG. 32, a slit 162 may be formed in the wide portion D (portion illustrated by slanting lines in FIG. 32). According to such an apparatus, the amount of inflation gas flow from an upstream inflation portion 12 to a downstream inflation portion 13 can be more freely adjusted.

In the second embodiment, only one of the first slit 26 of the first partitioning member 24 and the second slit 27 of the second partitioning member 25 may be formed in the wide portion D.

In the third embodiment, instead of forming the fabric sheet 11 of the airbag 30 by one piece of fabric, it may be formed by a front member on the front side and a rear member on the rear side.

Figure 33A:
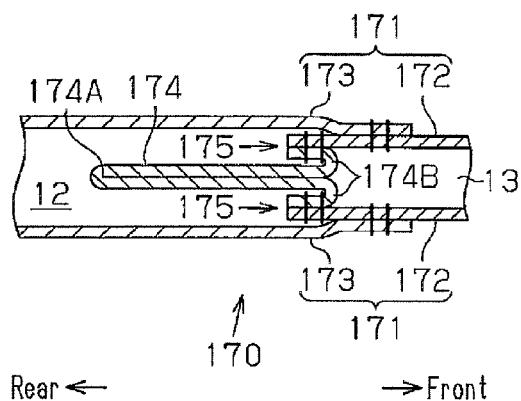
FIG. 33A is an enlarged cross-sectional view illustrating a portion where a fabric sheet and a partitioning member of an airbag according to another embodiment are joined.
Figure 33B:
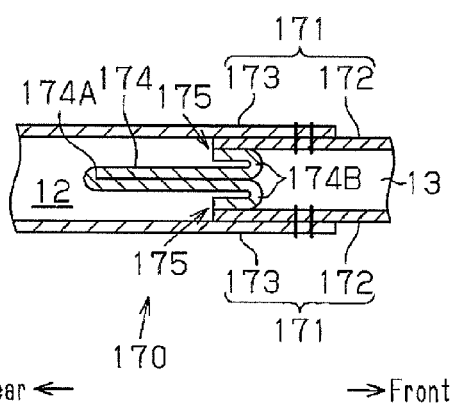
FIG. 33B is an enlarged cross-sectional view illustrating a non-joint portion of the airbag of FIG. 33A.

As an example of such an airbag, a cross-sectional structure of a portion where the fabric sheet and a partitioning member are joined is illustrated in FIG. 33A, and a cross-sectional structure of a portion where the fabric sheet and the partitioning member are not joined is illustrated in FIG. 33B.

As illustrated in FIGS. 33A and 33B, a fabric sheet 171 of an airbag 170 is formed by a front member 172 on a front side and a rear member 173 on a rear side. The front member 172 and the rear member 173 are sewn in a state in which a front edge portion of the rear member 173 is overlapped with a rear edge portion of the front member 172 in a thickness direction. Due to this, the rear edge portion of the front member 172 extends toward the rear side along an inner surface of the rear member 173. A partitioning member 174 that partitions an upstream inflation portion 12 and a downstream inflation portion 13 is located inside the airbag 170 in a state of being folded in half when the airbag 170 is in a non-inflated state. Specifically, a folding line 174A of the partitioning member 174 is located on the rear side, and peripheral portions of the partitioning member 174 are located on the front side. Further, the peripheral portions of the partitioning member 174 are folded toward the rear side along a folding line 174B. Further, the portion of the partitioning member 174 that is folded and the rear edge portion of the front member 172 are overlapped in the thickness direction, and the overlapped portion (overlapping portion 175) is sewn. In the above apparatus, the partitioning member 174 is joined to the fabric sheet 171 at joint portions in a manner by which the overlapping portion 175 extends toward the upstream inflation portion 12 (rear side) along the inner surface of the rear member 173. As illustrated in FIG. 33B, the peripheral portions of the partitioning member 174 are partially joined to the front member 172, and the peripheral portions of the partitioning member 174 are not joined to the front member 172 at a non-joint portion.

Figure 34:
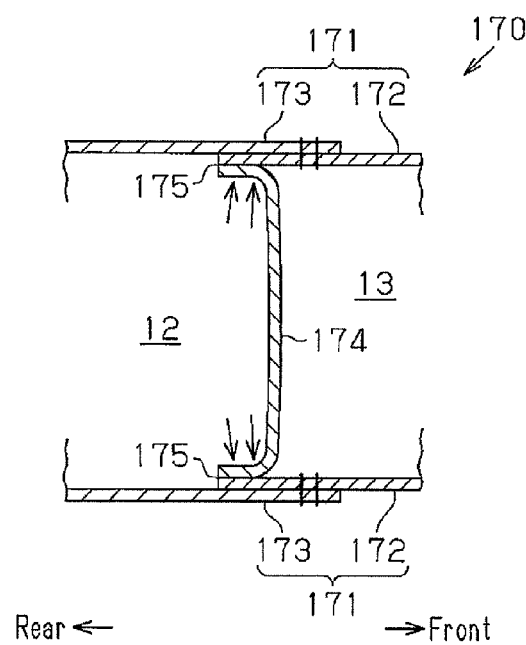
FIG. 34 is a cross-sectional view illustrating the non-joint portion of the airbag where the partitioning member is tensed by being deployed in a substantially planar shape.

Operation of providing the partitioning member 174 in the airbag 170 will now be described. FIG. 34 illustrates a cross-sectional structure of the airbag 170 of which partitioning member 174 is tensed by being deployed in a substantially planar shape. FIG. 34 illustrates the cross-sectional structure of the airbag 170 at the non-joint portion where the partitioning member 174 and the front member 172 are not joined in the overlapping portion 175.

As illustrated in FIG. 34, in the apparatus of the embodiment illustrated in FIGS. 33A and 33B, the partitioning member 174 is arranged in a manner by which the overlapping portion 175 of the peripheral portions of the partitioning member 174 and the rear edge portion of the front member 172 extends toward the upstream inflation portion 12 along the inner surface of the rear member 173. Due to this, as shown by arrows in FIG. 34, the internal pressure in the upstream inflation portion 12 acts to press the overlapping portion 175 against the inner surface of the rear member 173 upon the inflation of the upstream inflation portion 12. At this time, the non-joint portion in the overlapping portion 175 is also pressed against the inner surface of the rear member 173. Thus, a gap between the partitioning member 174 and the front member 172 is closed, and a communication of the upstream inflation portion 12 and the downstream inflation portion 13 is substantially shut off.

Figure 35:
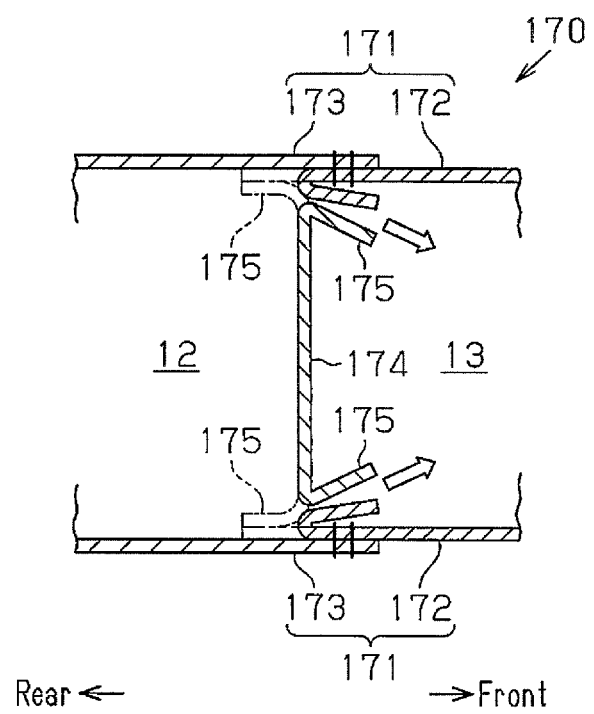
FIG. 35 is a cross-sectional view illustrating the non-joint portion of the airbag during restraint of an occupant.

Thereafter, when the occupant P is restrained by the airbag 170 by the airbag 170 being deployed and inflated, an external force (pressing force by the occupant P, and pressing force by the body side portion 6) acts on the airbag 170 by the restraint thereof. By the external force, the front member 172 and the rear member 173 of the fabric sheet 171 of the airbag 170, and the partitioning member 174 of the airbag 170 are warped. At this time, when the fabric sheet 171 deforms toward outside of the airbag 170 or the partitioning member 174 deforms toward inside of the airbag 170 at the non-joint portion, the gap between the partitioning member 174 and the fabric sheet 171 at the non-joint portion becomes large. In this case, the internal pressure of the upstream inflation portion 12 acts to press the overlapping portion 175 into the gap. As a result, as illustrated in FIG. 35, the non-joint portion of the overlapping portion 175 is pressed into the downstream inflation portion 13 by the internal pressure of the upstream inflation portion 12. Due to this, the inflow of the inflation gas from the upstream inflation portion 12 to the downstream inflation portion 13 is permitted, and the inflation gas flows in from the upstream inflation portion 12 to the downstream inflation portion 13 as illustrated by outline arrows in FIG. 35. Thus, according to the apparatus, the communication of the upstream inflation portion 12 and the downstream inflation portion 13 is shut off before the restraint of the occupant P by the airbag 170, while it is permitted during the restraint of the occupant P.

In each of the illustrated embodiments, the substantially entire airbag is formed of the inflation portion. However, the airbag may also partially include a non-inflation portion to which the inflation gas G is not supplied and not inflated.

In this case, the inflator 3 and the upstream inflation portion are connected by a tube, and the inflation gas may be supplied to the upstream inflation portion from the inflator 3 via the tube.

In the respective embodiments, not making any limitations to coupling the fabric sheet and the partitioning member of the airbag by sewing them together, they may be joined to one another by using other means such as adhesion and the like.

The invention is not limited to an airbag apparatus that protects portions from the shoulder portion PS to the thorax PT and the lumbar region PP as described above, and may be adapted to an airbag apparatus that protects a portion from the shoulder PS to the thorax PT, a portion from a head portion to the thorax PT, or a portion that is above the lumbar region PP (excluding the lumbar region PP) from impacts.

The invention may be adapted to an airbag having three or more inflation portions being partitioned formed inside an airbag.

The present invention does not necessarily have to be applied to the airbag apparatus that deploys and inflates the airbag on the side of the occupant, but may be applied to the airbag apparatus that inflates the airbag at the lower front of the legs of the occupant to protect the knees of the occupant.

Vehicles to which the airbag apparatus according to the present invention is applied include various industrial vehicles in addition to private automobiles.

Therefore, the present examples and embodiments are to be considered as illustrative and not restrictive and the invention is not to be limited to the details given herein, but may be modified within the scope and equivalence of the appended claims.

The invention claimed is:

1. An airbag apparatus comprising an airbag, wherein the airbag includes:
   an upstream inflation portion and a downstream inflation portion, which are defined inside the airbag, the upstream inflation portion being located upstream of the downstream inflation portion, wherein the upstream inflation portion is inflated by a supply of inflation gas, and the downstream inflation portion is inflated by an inflow of the inflation gas from the upstream inflation portion; and
   a gas inlet portion that causes the inflation gas to flow from the upstream inflation portion to the downstream inflation portion upon the inflation of the airbag, wherein, when the airbag restrains an occupant, the gas inlet portion increases a flow rate of the inflation gas from the upstream inflation portion to the downstream inflation portion in accordance with an external force applied to the airbag accompanying the restraint of the occupant compared to a flow rate of the inflation gas before the restraint of the occupant by the airbag, and the gas inlet portion is provided at a portion other than a portion where the external force becomes largest in the airbag.

2. The airbag apparatus according to claim 1, wherein
   the airbag includes a partitioning member that partitions the upstream inflation portion and the downstream inflation portion,
   the partitioning member includes a slit, and
   the gas inlet portion is formed by the slit.

3. The airbag apparatus according to claim 1, wherein
the airbag includes a first partitioning member and a second partitioning member that partition the upstream inflation portion and the downstream inflation portion,
the first partitioning member is located upstream of the second partitioning member,
the first partitioning member includes a first slit,
the second partitioning member includes a second slit,
the second slit is formed at a portion other than a portion to which the inflation gas flow via the first slit is directed, and
the gas inlet portion is formed by at least one of the first slit and the second slit.

4. The airbag apparatus according to claim 1, wherein
the airbag includes a partitioning member that partitions the upstream inflation portion and the downstream inflation portion,
the partitioning member includes a peripheral portion,
the peripheral portion includes a joint portion, which extends toward the upstream inflation portion along an outer wall of the airbag and is joined to the outer wall, and a non joint portion that is not joined to the outer wall, and
the gas inlet portion is formed by the non joint portion.

5. The airbag apparatus according to claim 1, wherein
the airbag includes a partitioning member that partitions the upstream inflation portion and the downstream inflation portion,
the apparatus further comprises a plurality of pressure regulating valves,
before restraint of an occupant by the airbag, the pressure regulating valves are closed by tension acting on the partitioning member,
during restraint of an occupant by the airbag, the partitioning member is warped by an external force applied to the airbag accompanying the restraint, and the warping of the partitioning member reduces the tension so that the pressure regulating valves are opened, and
the gas inlet portion is formed by at least one of the pressure regulating valves.

6. The airbag apparatus according to claim 2, wherein
the partitioning member includes a wide portion having a maximum width in a direction in which the slit extends, and
the portion where the external force becomes the largest is formed by the wide portion of the partitioning member.

7. The airbag apparatus according to claim 6, wherein the slit is provided at a portion other than the wide portion of the partitioning member.

* * * * *